(12) United States Patent
Leshinsky et al.

(10) Patent No.: US 9,817,587 B1
(45) Date of Patent: Nov. 14, 2017

(54) MEMORY-BASED ON-DEMAND DATA PAGE GENERATION

(71) Applicant: Amazon Technologies, Inc., Seattle, WA (US)

(72) Inventors: Yan Valerie Leshinsky, Kirkland, WA (US); James McClellan Corey, Seattle, WA (US); Mustafa Abrar, Issaquah, WA (US)

(73) Assignee: Amazon Technologies, Inc., Reno, NV (US)

( * ) Notice: Subject to any disclaimer, the term of this patent is extended or adjusted under 35 U.S.C. 154(b) by 316 days.

(21) Appl. No.: 14/638,898

(22) Filed: Mar. 4, 2015

(51) Int. Cl.
G06F 17/00 (2006.01)
G06F 3/06 (2006.01)
G06F 17/30 (2006.01)

(52) U.S. Cl.
CPC ............ G06F 3/0617 (2013.01); G06F 3/064 (2013.01); G06F 3/0673 (2013.01); G06F 17/30309 (2013.01)

(58) Field of Classification Search
CPC ........... G06F 11/1471; G06F 17/30368; G06F 17/30551; G06F 17/30371; G06F 17/30578; G06F 2201/80
See application file for complete search history.

(56) References Cited

U.S. PATENT DOCUMENTS

| 5,524,205 A | 6/1996 | Lomet et al. |
| 5,907,848 A | 5/1999 | Zaiken et al. |
| 5,995,980 A | 11/1999 | Olson et al. |
| 6,292,808 B1 | 9/2001 | Obermarck et al. |
| 6,631,374 B1 | 10/2003 | Klein et al. |
| 6,976,022 B2 | 12/2005 | Vemuri et al. |
| 7,873,683 B2 | 1/2011 | Dodge |
| 8,412,752 B2 | 4/2013 | Dodge |
| 2015/0261443 A1* | 9/2015 | Wei .................. G06F 3/065 711/162 |

OTHER PUBLICATIONS

U.S. Appl. No. 14/201,517, filed Mar. 7, 2014, Anurag Gupta, et al.
U.S. Appl. No. 14/201,493, filed Mar. 7, 2014, Anurag Gupta, et al.
U.S. Appl. No. 14/530,477, filed Oct. 31, 2014, Pradeep Madhavarapu, et al.

* cited by examiner

Primary Examiner — Truong Vo
(74) Attorney, Agent, or Firm — Robert C. Kowert; Meyertons, Hood, Kivlin, Kowert & Goetzel, P.C.

(57) ABSTRACT

A data store maintaining data may implement memory-based on-demand data page generation. Log records may be maintained in system memory according to a version threshold for data pages of data stored in persistent storage. When a request for a version of a particular data page is received that is within the version threshold, the data page may be obtained from persistent storage and log records associated with the data page may be applied to the data page to generate the requested version of the data page. The version threshold for the data pages may change, and log records in system memory may be identified for coalesce operations. The coalesce operations may be efficiently performed (e.g., in the background), updating the data pages in persistent storage to include the changes of the identified log records and space in system memory for the identified log records may be reclaimed.

20 Claims, 13 Drawing Sheets

MEMORY-BASED ON-DEMAND DATA PAGE GENERATION

BACKGROUND

Data storage systems may be structured to store data for storage clients in many different ways. For some storage clients maintaining a record of changes to data, such as by logging records of changes, may provide useful information. The way in which data changes over time, for instance, may be evaluated to recover from errors, identify application performance, or obtain other useful information about how a storage system is utilized and/or a storage client is operating. Providing the different versions of data to a storage client may prove a challenge as recording changes and generating versions of data based on the recorded changes may consume limited computing resources which may be needed for performing other storage system or storage client tasks.

Figure 1:
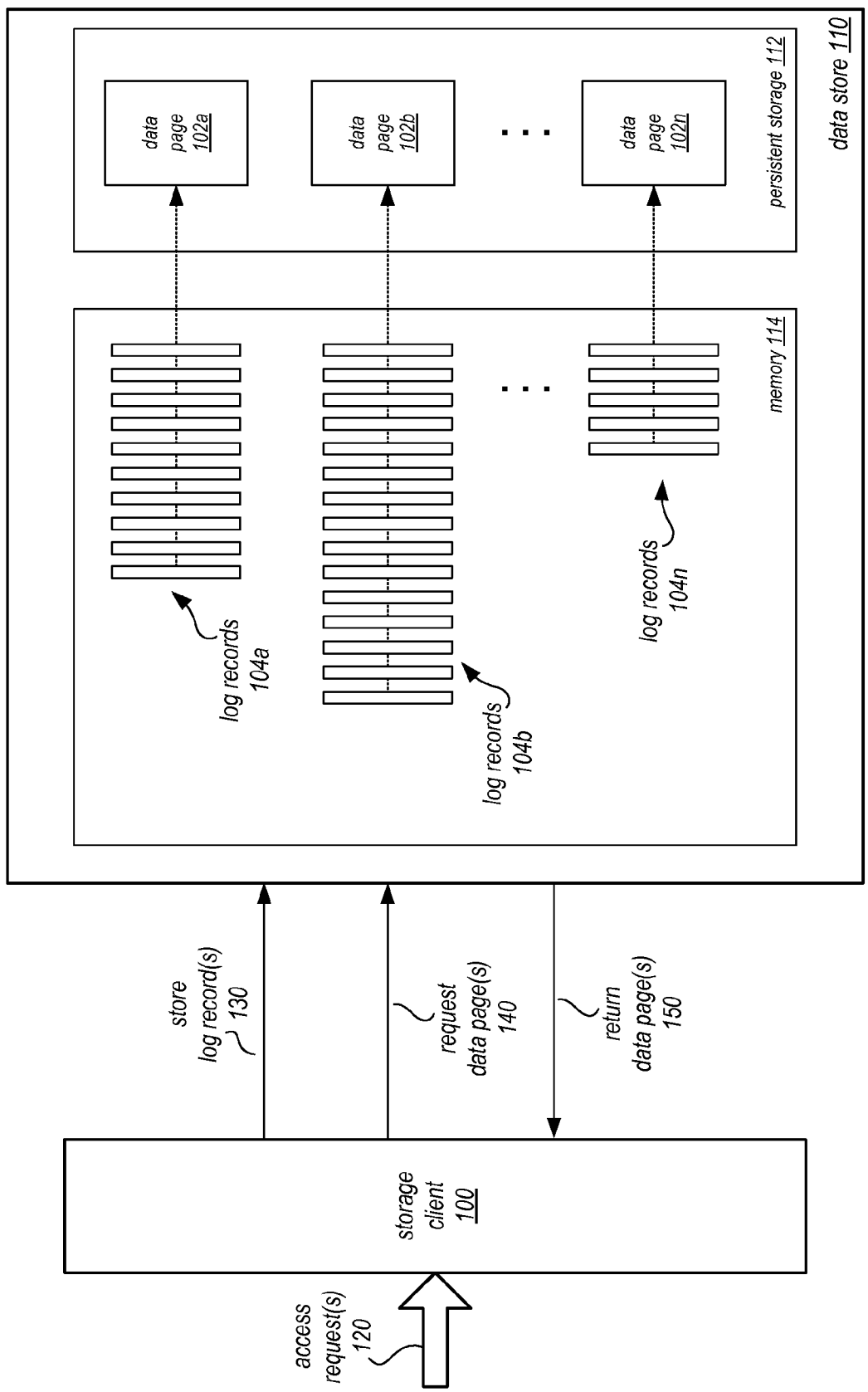
FIG. 1 is a block diagram illustrating memory-based on-demand data page generation, according to some embodiments.

While embodiments are described herein by way of example for several embodiments and illustrative drawings, those skilled in the art will recognize that the embodiments are not limited to the embodiments or drawings described. It should be understood, that the drawings and detailed description thereto are not intended to limit embodiments to the particular form disclosed, but on the contrary, the intention is to cover all modifications, equivalents and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). The words "include," "including," and "includes" indicate open-ended relationships and therefore mean including, but not limited to. Similarly, the words "have," "having," and "has" also indicate open-ended relationships, and thus mean having, but not limited to. The terms "first," "second," "third," and so forth as used herein are used as labels for nouns that they precede, and do not imply any type of ordering (e.g., spatial, temporal, logical, etc.) unless such an ordering is otherwise explicitly indicated.

Various components may be described as "configured to" perform a task or tasks. In such contexts, "configured to" is a broad recitation generally meaning "having structure that" performs the task or tasks during operation. As such, the component can be configured to perform the task even when the component is not currently performing that task (e.g., a computer system may be configured to perform operations even when the operations are not currently being performed). In some contexts, "configured to" may be a broad recitation of structure generally meaning "having circuitry that" performs the task or tasks during operation. As such, the component can be configured to perform the task even when the component is not currently on. In general, the circuitry that forms the structure corresponding to "configured to" may include hardware circuits.

Various components may be described as performing a task or tasks, for convenience in the description. Such descriptions should be interpreted as including the phrase "configured to." Reciting a component that is configured to perform one or more tasks is expressly intended not to invoke 35 U.S.C. §112, paragraph six, interpretation for that component.

"Based On." As used herein, this term is used to describe one or more factors that affect a determination. This term does not foreclose additional factors that may affect a determination. That is, a determination may be solely based on those factors or based, at least in part, on those factors. Consider the phrase "determine A based on B." While B may be a factor that affects the determination of A, such a phrase does not foreclose the determination of A from also being based on C. In other instances, A may be determined based solely on B.

The scope of the present disclosure includes any feature or combination of features disclosed herein (either explicitly or implicitly), or any generalization thereof, whether or not it mitigates any or all of the problems addressed herein. Accordingly, new claims may be formulated during prosecution of this application (or an application claiming priority thereto) to any such combination of features. In particular, with reference to the appended claims, features from dependent claims may be combined with those of the independent claims and features from respective independent claims may be combined in any appropriate manner and not merely in the specific combinations enumerated in the appended claims.

DETAILED DESCRIPTION

Various embodiments of memory-based on-demand data page generation are disclosed. Typically, log records describing changes to data pages of a storage system may be stored in persistent storage. If a particular version or instance of a data page is requested, the log records describing that version or instance may be obtained from persistent storage and applied to a version of the data page also maintained in persistent storage to generate the requested version of the data page on-demand. If there are many log records maintained for a data page, then performing on-demand page generation may become costly in terms of I/O operations to read the various log records from persistent storage. To reduce the number of I/O operations to obtain a particular version of a data page, a coalesce operation may be performed to reduce or eliminate the number of log records to be applied when generating a version of the data page. To perform a coalesce operation two or more log records for a page may be applied to a current version of a data page to generate a new instance of the data page that includes the changes to the data page described by the log records. The instance of the page may then be stored in persistent storage (e.g., either to a new location or an overwrite of the storage location for the current version of the page). While performing coalesce operations allows data pages to be easily read without applying numerous log records (as the log records changes may be incorporated into updated versions of the data pages), a coalesce operation incurs similar I/O costs. As with on-demand page generation, the I/O operations to read the log records and store the new version of the data page may be performed. Coalesce operations may not, therefore, be performed frequently enough such that an updated version of each data page is available to read without impacting the performance of other requests for data pages.

Memory-based on-demand data page generation may be implemented in various embodiments to provide efficient and consistent I/O costs for generating data pages on-demand. Log records for data pages may be maintained in system memory so that when a request for a particular data page is received, the I/O costs incurred may be limited to the I/O operation to retrieve the data page from persistent storage. The log records indicating changes to the particular data page may be resident in system memory and applied to the obtained data page to generate a requested version of the particular data page. Thus, in some embodiments, a data page version may be generated without obtaining log records from persistent storage. In this way, a single I/O operation to obtain a data page from persistent storage may be performed, allowing for consistent I/O costs for handling each request for a data page. Coalesce operations to update data pages in persistent storage may be performed optimally, reclaiming space for new log records to be maintained in system memory without impeding the performance of handling requests for data pages.

FIG. 1 is a block diagram illustrating memory-based on-demand data page generation, according to some embodiments. Data store 110 may persistently maintain data for various types of systems, such as storage client 100 (e.g., a database or file system). Data store 110 may store data in data pages, data blocks, or some other logical arrangement of data storage (which may be different than the arrangement of the data on the one or more persistent storage devices that make up the data store). As illustrated in FIG. 1, data store 110 maintains data pages, 102a, 102b through 102n in persistent storage 112. Persistent storage 112 may be one or more persistent storage devices, such as block-based storage devices (e.g., hard disk drives or solid state drives). These data pages 102 may be accessed by storage client 100 in order to perform various operations (e.g., read/write data).

In various embodiments, storage client 100 may send/store log record(s) 130 indicating changes to different data pages in data store 110. In at least some embodiments, these log record(s) may be written to memory 114 of data store 110. Memory 114 may be one or more system memory devices (e.g., such as one or more of the various memory devices described below with regard to system memory 2020 in FIG. 13). As noted above, the log record(s) 104a may indicate changes to particular data pages. For example, log records 104a are linked to data page 102a, describing changes to data page 102a. Similarly, log records 104b are linked to data page 102b, and log records 104n are linked to data page 102n. Please note that the illustration of log records is logical and not intended to convey any particular ordering or arrangement of log records as they are maintained in memory. For example, the log records may be maintained according to a log sequence or ordering, such as a log sequence number for each log record. In at least some embodiments, log record(s) may also be stored in persistent storage 112 (not illustrated) as part of a log for data pages 102.

Maintaining log records 104 in memory 114 may be advantageous for many different data store operations. For example, in a distributed storage system log records received at one storage node of the distributed storage system may be easily sent, replicated, or stored to other storage nodes without costly I/O operations to persistent storage. Other types of requests from client, such as requests for particular metadata or other operations performed based on information included in log records may be efficiently performed. In another example, as illustrated in FIG. 1, requests for data page(s) 140 may be received from storage client 100. The requests may indicate a particular version (e.g., identified by a particular log sequence number or the current/latest version). To provide the particular version of the data page, persistent storage 112 may be accessed to obtain the data page 102 and log records 104 linked to the data page may be applied from memory to the obtained data page, generating the requested version of the particular data page. The generated data page(s) may be provided or returned 150 to storage client 100. Consider the scenario where a request for data page 102a is received at data store 110. Persistent storage 112 may be accessed to obtain data page 102a (e.g., by looking up a storage location in persistent storage 112 located in an in-memory page location index in memory 114—not illustrated), and the log records 104a linked to data page 102a may be applied from memory 114 to generate the requested version of page 104a.

Note that in some cases not all log records for a particular data page, such as all log records 104a, may be applied—as the requested version of a page may not be the most current. However, in some embodiments, not all previously received log records for a data page may be maintained in memory 114 without exceeding the capacity of memory 114. Therefore, in at least some embodiments, a version threshold for data pages in persistent storage may be enforced, as discussed in more detail below with regard to FIG. 7. For example, a version threshold may indicate a minimum readable version (e.g., a particular log sequence number) at which a data page may be read. In this way, those log records indicating changes prior to a version threshold may be coalesced into the data pages maintained in persistent storage 110 and the system memory reclaimed for storing new log records (or other data). Coalesce operations to update data pages may be scheduled and performed optimally (e.g., as a background process) so that other data store operations (e.g., handling requests for data pages or storing new log records) may not be impacted.

Please note that the examples described above with regard to FIG. 1 are logical illustrations and are not intended to be limiting as to the type, arrangement, implementation or functionality of a storage client or data store. Log records or data pages, for example may be stored or maintained in many different ways at data store 110.

As noted above, data stores implementing memory-based on-demand data page generation may store data for many different types of systems, applications, and/or clients. The specification next describes an example of a network-based database service configured to utilize a distributed storage service implementing memory-based on-demand data page generation. Included in the description are various aspects of the example database service, such as a database engine, and the separate distributed storage service. The specification then describes flowcharts of various embodiments of methods for memory-based on-demand data page generation. Next, the specification describes an example system that may implement the disclosed techniques. Various examples are provided throughout the specification.

The systems described herein may, in some embodiments, implement a network-based service that enables clients (e.g., subscribers) to operate a data storage system in a cloud computing environment. In some embodiments, the data storage system may be an enterprise-class database system that is highly scalable and extensible. In some embodiments, queries may be directed to database storage that is distributed across multiple physical resources, and the database system may be scaled up or down on an as needed basis. The database system may work effectively with database schemas of various types and/or organizations, in different embodiments. In some embodiments, clients/subscribers may submit queries in a number of ways, e.g., interactively via an SQL interface to the database system. In other embodiments, external applications and programs may submit queries using Open Database Connectivity (ODBC) and/or Java Database Connectivity (JDBC) driver interfaces to the database system.

More specifically, the systems described herein may, in some embodiments, implement a service-oriented architecture in which various functional components of a single database system are intrinsically distributed. For example, rather than lashing together multiple complete and monolithic database instances (each of which may include extraneous functionality, such as an application server, search functionality, or other functionality beyond that required to provide the core functions of a database), these systems may organize the basic operations of a database (e.g., query processing, transaction management, caching and storage) into tiers that may be individually and independently scalable. For example, in some embodiments, each database instance in the systems described herein may include a database tier (which may include a single database engine head node and a client-side storage system driver), and a separate, distributed storage system (which may include multiple storage nodes that collectively perform some of the operations traditionally performed in the database tier of existing systems).

As described in more detail herein, in some embodiments, some of the lowest level operations of a database, (e.g., backup, restore, snapshot, recovery, log record manipulation, and/or various space management operations) may be offloaded from the database engine to the storage layer (or tier), such as a distributed storage system, and distributed across multiple nodes and storage devices. For example, in some embodiments, rather than the database engine applying changes to a database (or data pages thereof) and then sending the modified data pages to the storage layer, the application of changes to the stored database (and data pages thereof) may be the responsibility of the storage layer itself. In such embodiments, redo log records, rather than modified data pages, may be sent to the storage layer, after which redo processing (e.g., the application of the redo log records) may be performed somewhat lazily and in a distributed manner (e.g., by a background process), such as by implementing in-memory on-demand data page generation. In some embodiments, crash recovery (e.g., the rebuilding of data pages from stored redo log records) may also be performed by the storage layer and may also be performed by a distributed (and, in some cases, lazy) background process.

In some embodiments, because only redo logs (and not modified data pages) are sent to the storage layer, there may be much less network traffic between the database tier and the storage layer than in existing database systems. In some embodiments, each redo log may be on the order of one-tenth the size of the corresponding data page for which it specifies a change. Note that requests sent from the database tier and the distributed storage system may be asynchronous and that multiple such requests may be in flight at a time.

In general, after being given a piece of data, a primary requirement of a database is that it can eventually give that piece of data back. To do this, the database may include several different components (or tiers), each of which performs a different function. For example, a traditional database may be thought of as having three tiers: a first tier for performing query parsing, optimization and execution; a second tier for providing transactionality, recovery, and durability; and a third tier that provides storage, either on locally attached disks or on network-attached storage. As noted above, previous attempts to scale a traditional database have typically involved replicating all three tiers of the database and distributing those replicated database instances across multiple machines.

In some embodiments, the systems described herein may partition functionality of a database system differently than in a traditional database, and may distribute only a subset of the functional components (rather than a complete database instance) across multiple machines in order to implement scaling. For example, in some embodiments, a client-facing tier may be configured to receive a request specifying what data is to be stored or retrieved, but not how to store or retrieve the data. This tier may perform request parsing and/or optimization (e.g., SQL parsing and optimization), while another tier may be responsible for query execution. In some embodiments, a third tier may be responsible for providing transactionality and consistency of results. For example, this tier may be configured to enforce some of the so-called ACID properties, in particular, the Atomicity of transactions that target the database, maintaining Consistency within the database, and ensuring Isolation between the transactions that target the database. In some embodiments, a fourth tier may then be responsible for providing Durability of the stored data in the presence of various sorts of faults. For example, this tier may be responsible for change logging, recovery from a database crash, managing access to the underlying storage volumes and/or space management in the underlying storage volumes.

In various embodiments, a database instance may include multiple functional components (or layers), each of which provides a portion of the functionality of the database instance. In one such example, a database instance may include a query parsing and query optimization layer, a query execution layer, a transactionality and consistency management layer, and a durability and space management layer. As noted above, in some existing database systems, scaling a database instance may involve duplicating the entire database instance one or more times (including all of the example layers), and then adding glue logic to stitch them together. In some embodiments, the systems described herein may instead offload the functionality of durability and space management layer from the database tier to a separate storage layer, and may distribute that functionality across multiple storage nodes in the storage layer.

In some embodiments, the database systems described herein may retain much of the structure of the upper half of the database instance, such as query parsing and query optimization layer, a query execution layer, and a transactionality and consistency management layer, but may redistribute responsibility for at least portions of the backup, restore, snapshot, recovery, and/or various space management operations to the storage tier. Redistributing functionality in this manner and tightly coupling log processing between the database tier and the storage tier may improve performance, increase availability and reduce costs, when compared to previous approaches to providing a scalable database. For example, network and input/output bandwidth requirements may be reduced, since only redo log records (which are much smaller in size than the actual data pages) may be shipped across nodes or persisted within the latency path of write operations. In addition, on-demand generation of data pages can be performed, allowing coalesce operations to generate/update data pages independently in the background on each storage node (as foreground processing allows), without blocking incoming write or read operations. In some embodiments, the storage system may be log-structured, using non-overwrite storage that may allow backup, restore, snapshots, point-in-time recovery, and volume growth operations to be performed more efficiently, e.g., by using metadata manipulation rather than movement or copying of a data page. In some embodiments, the storage layer may also assume the responsibility for the replication of data stored on behalf of clients (and/or metadata associated with that data, such as redo log records) across multiple storage nodes. For example, data (and/or metadata) may be replicated locally (e.g., within a single "availability zone" in which a collection of storage nodes executes on its own physically distinct, independent infrastructure) and/or across availability zones in a single region or in different regions.

In various embodiments, the database systems described herein may support a standard or custom application programming interface (API) for a variety of database operations. For example, the API may support operations for creating a database, creating a table, altering a table, creating a user, dropping a user, inserting one or more rows in a table, copying values, selecting data from within a table (e.g., querying a table), canceling or aborting a query, creating a snapshot, and/or other operations.

In some embodiments, the database tier of a database instance may include a database engine head node server that receives read and/or write requests from various client programs (e.g., applications) and/or subscribers (users), then parses them and develops an execution plan to carry out the associated database operation(s). For example, the database engine head node may develop the series of steps necessary to obtain results for complex queries and joins. In some embodiments, the database engine head node may manage communications between the database tier of the database system and clients/subscribers, as well as communications between the database tier and a separate distributed storage system.

In some embodiments, the database engine head node may be responsible for receiving SQL requests from end clients through a JDBC or ODBC interface and for performing SQL processing and transaction management (which may include locking) locally. However, rather than generating data pages locally, the database engine head node (or various components thereof) may generate redo log records and may ship them to the appropriate nodes of a separate distributed storage system. In some embodiments, a client-side driver for the distributed storage system may be hosted on the database engine head node and may be responsible for routing redo log records to the storage system node (or nodes) that store the segments (or data pages thereof) to which those redo log records are directed. For example, in some embodiments, each segment may be mirrored (or otherwise made durable) on multiple storage system nodes that form a protection group. In such embodiments, the client-side driver may keep track of the nodes on which each segment is stored and may route redo logs to all of the nodes on which a segment is stored (e.g., asynchronously and in parallel, at substantially the same time), when a client request is received. As soon as the client-side driver receives an acknowledgement back from a write quorum of the storage nodes in the protection group (which may indicate that the redo log record has been written to the storage node), it may send an acknowledgement of the requested change to the database tier (e.g., to the database engine head node). For example, in embodiments in which data is made durable through the use of protection groups, the database engine head node may not be able to commit a transaction until and unless the client-side driver receives a reply from enough storage node instances to constitute a write quorum, as may be defined in a protection group policy for the data.

In some embodiments, the database tier (or more specifically, the database engine head node) may include a cache in which recently accessed data pages are held temporarily. In such embodiments, if a write request is received that targets a data page held in such a cache, in addition to shipping a corresponding redo log record to the storage layer, the database engine may apply the change to the copy of the data page held in its cache. However, unlike in other database systems, a data page held in this cache may not ever be flushed to the storage layer, and it may be discarded at any time (e.g., at any time after the redo log record for a write request that was most recently applied to the cached copy has been sent to the storage layer and acknowledged). The cache may implement any of various locking mechanisms to control access to the cache by at most one writer (or multiple readers) at a time, in different embodiments. Note, however, that in embodiments that include such a cache, the cache may not be distributed across multiple nodes, but may exist only on the database engine head node for a given database instance. Therefore, there may be no cache coherency or consistency issues to manage.

In some embodiments, the database tier may support the use of synchronous or asynchronous read replicas in the system, e.g., read-only copies of data on different nodes of the database tier to which read requests can be routed. In such embodiments, if the database engine head node for a given database receives a read request directed to a particular data page, it may route the request to any one (or a particular one) of these read-only copies. In some embodiments, the client-side driver in the database engine head node may be configured to notify these other nodes about updates and/or invalidations to cached data pages (e.g., in order to prompt them to invalidate their caches, after which they may request updated copies of updated data pages from the storage layer).

In some embodiments, the client-side driver running on the database engine head node may expose a private interface to the storage tier. In some embodiments, it may also expose a traditional iSCSI interface to one or more other components (e.g., other database engines or virtual computing services components). In some embodiments, storage for a database instance in the storage tier may be modeled as a single volume that can grow in size without limits, and that can have an unlimited number of IOPS associated with it. When a volume is created, it may be created with a specific size, with a specific availability/durability characteristic (e.g., specifying how it is replicated), and/or with an IOPS rate associated with it (e.g., both peak and sustained). For example, in some embodiments, a variety of different durability models may be supported, and users/subscribers may be able to specify, for their database, a number of replication copies, zones, or regions and/or whether replication is synchronous or asynchronous based upon their durability, performance and cost objectives.

In some embodiments, the client side driver may maintain metadata about the volume and may directly send asynchronous requests to each of the storage nodes necessary to fulfill read requests and write requests without requiring additional hops between storage nodes. For example, in some embodiments, in response to a request to make a change to a database, the client-side driver may be configured to determine the one or more nodes that are implementing the storage for the targeted data page, and to route the redo log record(s) specifying that change to those storage nodes. The storage nodes may then be responsible for applying the change specified in the redo log record (e.g., as part of a coalesce operation to the targeted data page at some point in the future), such as by performing memory-based on-demand data page generation as discussed below. As writes are acknowledged back to the client-side driver, the client-side driver may advance the point at which the volume is durable and may acknowledge commits back to the database tier. As previously noted, in some embodiments, the client-side driver may not ever send data pages to the storage node servers. This may not only reduce network traffic, but may also remove the need for the checkpoint or background writer threads that constrain foreground-processing throughput in previous database systems.

In some embodiments, because accesses to the log-structured data storage for the redo log records may consist of a series of sequential input/output operations (rather than random input/output operations), the changes being made may be tightly packed together. It should also be noted that, in contrast to existing systems in which each change to a data page results in two input/output operations to persistent data storage (one for the redo log and one for the modified data page itself), in some embodiments, the systems described herein may avoid this "write amplification" by generating data pages for read requests on-demand (coalescing data pages at the storage nodes of the distributed storage system in the background as efficient) by applying redo log records maintained in system memory at a storage node.

Figure 2:
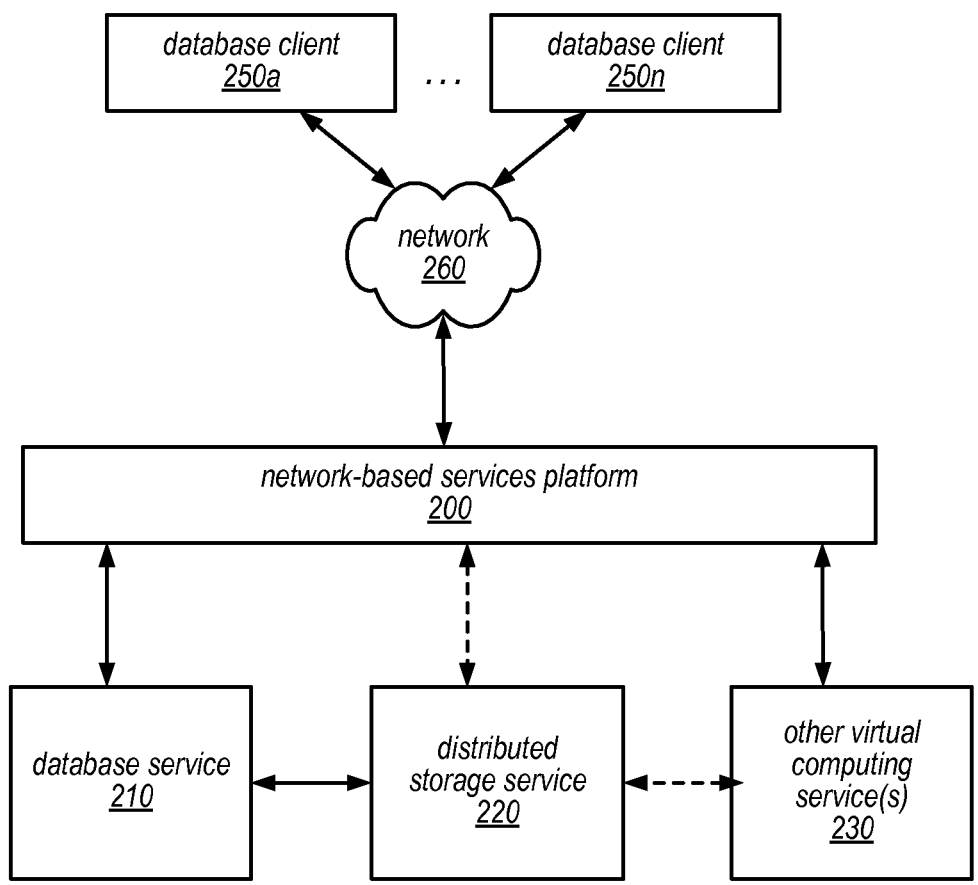
FIG. 2 is a block diagram illustrating a service system architecture that may be configured to implement a network-based distributed storage service and other services such as network-based database service, according to some embodiments.

One embodiment of a service system architecture that may be configured to implement a network-based services-based database service is illustrated in FIG. 2. In the illustrated embodiment, a number of clients (shown as clients 250a-250n) may be configured to interact with a network-based services platform 200 via a network 260. Network-based services platform 200 may be configured to interface with one or more instances of a database service 210, a distributed storage service 220 and/or one or more other virtual computing services 230. It is noted that where one or more instances of a given component may exist, reference to that component herein may be made in either the singular or the plural. However, usage of either form is not intended to preclude the other.

In various embodiments, the components illustrated in FIG. 2 may be implemented directly within computer hardware, as instructions directly or indirectly executable by computer hardware (e.g., a microprocessor or computer system), or using a combination of these techniques. For example, the components of FIG. 2 may be implemented by a system that includes a number of computing nodes (or simply, nodes), each of which may be similar to the computer system embodiment illustrated in FIG. 13 and described below. In various embodiments, the functionality of a given service system component (e.g., a component of the database service or a component of the storage service) may be implemented by a particular node or may be distributed across several nodes. In some embodiments, a given node may implement the functionality of more than one service system component (e.g., more than one database service system component).

Generally speaking, clients 250 may encompass any type of client configurable to submit network-based services requests to network-based services platform 200 via network 260, including requests for database services (e.g., a request to generate a snapshot, etc.). For example, a given client 250 may include a suitable version of a web browser, or may include a plug-in module or other type of code module configured to execute as an extension to or within an execution environment provided by a web browser. Alternatively, a client 250 (e.g., a database service client) may encompass an application such as a database application (or user interface thereof), a media application, an office application or any other application that may make use of persistent storage resources to store and/or access one or more databases. In some embodiments, such an application may include sufficient protocol support (e.g., for a suitable version of Hypertext Transfer Protocol (HTTP)) for generating and processing network-based services requests without necessarily implementing full browser support for all types of network-based data. That is, client 250 may be an application configured to interact directly with network-based services platform 200. In some embodiments, client 250 may be configured to generate network-based services requests according to a Representational State Transfer (REST)-style network-based services architecture, a document- or message-based network-based services architecture, or another suitable network-based services architecture.

In some embodiments, a client 250 (e.g., a database service client) may be configured to provide access to network-based storage of databases to other applications in a manner that is transparent to those applications. For example, client 250 may be configured to integrate with an operating system or file system to provide storage in accordance with a suitable variant of the storage models described herein. However, the operating system or file system may present a different storage interface to applications, such as a conventional file system hierarchy of files, directories and/or folders. In such an embodiment, applications may not need to be modified to make use of the storage system service model. Instead, the details of interfacing to network-based services platform 200 may be coordinated by client 250 and the operating system or file system on behalf of applications executing within the operating system environment.

Clients 250 may convey network-based services requests (e.g., a snapshot request, parameters of a snapshot request, read request, restore a snapshot, etc.) to and receive responses from network-based services platform 200 via network 260. In various embodiments, network 260 may encompass any suitable combination of networking hardware and protocols necessary to establish network-based-based communications between clients 250 and platform 200. For example, network 260 may generally encompass the various telecommunications networks and service providers that collectively implement the Internet. Network 260 may also include private networks such as local area networks (LANs) or wide area networks (WANs) as well as public or private wireless networks. For example, both a given client 250 and network-based services platform 200 may be respectively provisioned within enterprises having their own internal networks. In such an embodiment, network 260 may include the hardware (e.g., modems, routers, switches, load balancers, proxy servers, etc.) and software (e.g., protocol stacks, accounting software, firewall/security software, etc.) necessary to establish a networking link between given client 250 and the Internet as well as between the Internet and network-based services platform 200. It is noted that in some embodiments, clients 250 may communicate with network-based services platform 200 using a private network rather than the public Internet. For example, clients 250 may be provisioned within the same enterprise as a database service system (e.g., a system that implements database service 210 and/or distributed storage service 220). In such a case, clients 250 may communicate with platform 200 entirely through a private network 260 (e.g., a LAN or WAN that may use Internet-based communication protocols but which is not publicly accessible).

Generally speaking, network-based services platform 200 may be configured to implement one or more service endpoints configured to receive and process network-based services requests, such as requests to access data pages (or records thereof). For example, network-based services platform 200 may include hardware and/or software configured to implement a particular endpoint, such that an HTTP-based network-based services request directed to that endpoint is properly received and processed. In one embodiment, network-based services platform 200 may be implemented as a server system configured to receive network-based services requests from clients 250 and to forward them to components of a system that implements database service 210, distributed storage service 220 and/or another virtual computing service 230 for processing. In other embodiments, network-based services platform 200 may be configured as a number of distinct systems (e.g., in a cluster topology) implementing load balancing and other request management features configured to dynamically manage large-scale network-based services request processing loads. In various embodiments, network-based services platform 200 may be configured to support REST-style or document-based (e.g., SOAP-based) types of network-based services requests.

In addition to functioning as an addressable endpoint for clients' network-based services requests, in some embodiments, network-based services platform 200 may implement various client management features. For example, platform 200 may coordinate the metering and accounting of client usage of network-based services, including storage resources, such as by tracking the identities of requesting clients 250, the number and/or frequency of client requests, the size of data tables (or records thereof) stored or retrieved on behalf of clients 250, overall storage bandwidth used by clients 250, class of storage requested by clients 250, or any other measurable client usage parameter. Platform 200 may also implement financial accounting and billing systems, or may maintain a database of usage data that may be queried and processed by external systems for reporting and billing of client usage activity. In certain embodiments, platform 200 may be configured to collect, monitor and/or aggregate a variety of storage service system operational metrics, such as metrics reflecting the rates and types of requests received from clients 250, bandwidth utilized by such requests, system processing latency for such requests, system component utilization (e.g., network bandwidth and/or storage utilization within the storage service system), rates and types of errors resulting from requests, characteristics of stored and requested data pages or records thereof (e.g., size, data type, etc.), or any other suitable metrics. In some embodiments such metrics may be used by system administrators to tune and maintain system components, while in other embodiments such metrics (or relevant portions of such metrics) may be exposed to clients 250 to enable such clients to monitor their usage of database service 210, distributed storage service 220 and/or another virtual computing service 230 (or the underlying systems that implement those services).

In some embodiments, network-based services platform 200 may also implement user authentication and access control procedures. For example, for a given network-based services request to access a particular database, platform 200 may be configured to ascertain whether the client 250 associated with the request is authorized to access the particular database. Platform 200 may determine such authorization by, for example, evaluating an identity, password or other credential against credentials associated with the particular database, or evaluating the requested access to the particular database against an access control list for the particular database. For example, if a client 250 does not have sufficient credentials to access the particular database, platform 200 may reject the corresponding network-based services request, for example by returning a response to the requesting client 250 indicating an error condition. Various access control policies may be stored as records or lists of access control information by database service 210, distributed storage service 220 and/or other virtual computing services 230.

It is noted that while network-based services platform 200 may represent the primary interface through which clients 250 may access the features of a database system that implements database service 210, it need not represent the sole interface to such features. For example, an alternate API that may be distinct from a network-based services interface may be used to allow clients internal to the enterprise providing the database system to bypass network-based services platform 200. Note that in many of the examples described herein, distributed storage service 220 may be internal to a computing system or an enterprise system that provides database services to clients 250, and may not be exposed to external clients (e.g., users or client applications). In such embodiments, the internal "client" (e.g., database service 210) may access distributed storage service 220 over a local or private network, shown as the solid line between distributed storage service 220 and database service 210 (e.g., through an API directly between the systems that implement these services). In such embodiments, the use of distributed storage service 220 in storing databases on behalf of clients 250 may be transparent to those clients. In other embodiments, distributed storage service 220 may be exposed to clients 250 through network-based services platform 200 to provide storage of databases or other information for applications other than those that rely on database service 210 for database management. This is illustrated in FIG. 2 by the dashed line between network-based services platform 200 and distributed storage service 220. In such embodiments, clients of the distributed storage service 220 may access distributed storage service 220 via network 260 (e.g., over the Internet). In some embodiments, a virtual computing service 230 may be configured to receive storage services from distributed storage service 220 (e.g., through an API directly between the virtual computing service 230 and distributed storage service 220) to store objects used in performing computing services 230 on behalf of a client 250. This is illustrated in FIG. 2 by the dashed line between virtual computing service 230 and distributed storage service 220. In some cases, the accounting and/or credentialing services of platform 200 may be unnecessary for internal clients such as administrative clients or between service components within the same enterprise.

Although not illustrated, in various embodiments distributed storage service 220 may be configured to interface with backup data store, system, service, or device. Various data, such as data pages, log records, and/or any other data maintained by distributed storage service internal clients, such as database service 210 or other virtual computing services 230, and/or external clients such as clients 250a through 250n, may be sent to a backup data store.

Note that in various embodiments, different storage policies may be implemented by database service 210 and/or distributed storage service 220. Examples of such storage policies may include a durability policy (e.g., a policy indicating the number of instances of a database (or data page thereof) that will be stored and the number of different nodes on which they will be stored) and/or a load balancing policy (which may distribute databases, or data pages thereof, across different nodes, volumes and/or disks in an attempt to equalize request traffic). In addition, different storage policies may be applied to different types of stored items by various one of the services. For example, in some embodiments, distributed storage service 220 may implement a higher durability for redo log records than for data pages.

Figure 3:
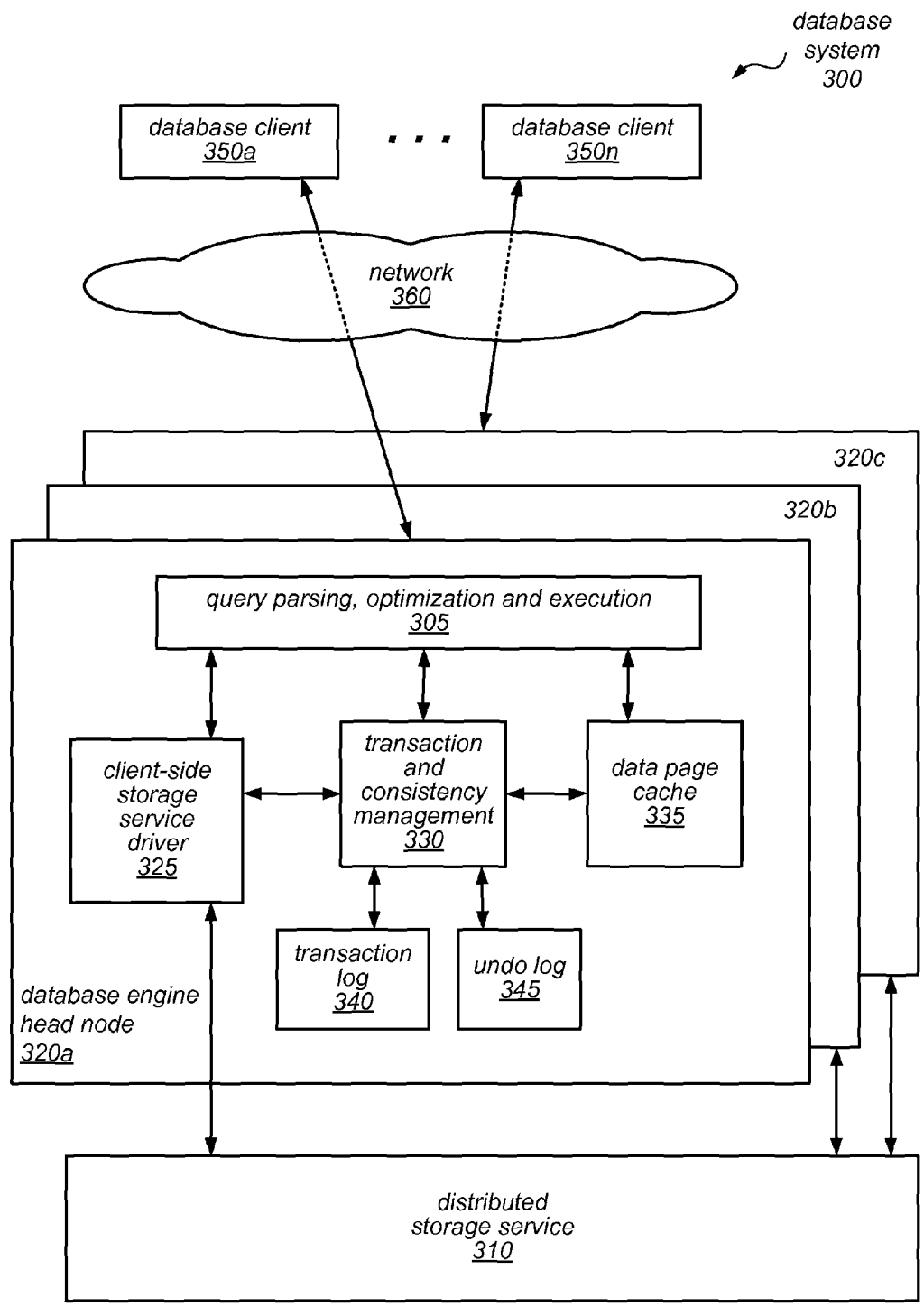
FIG. 3 is a block diagram illustrating various components of a database system that includes a database engine and a separate distributed storage service, according to some embodiments.

FIG. 3 is a block diagram illustrating various components of a database system that includes a database engine and a separate distributed database storage service, according to one embodiment. In this example, database system 300 includes a respective database engine head node 320 for each of several databases and a distributed storage service 310 (which may or may not be visible to the clients of the database system, shown as database clients 350a-350n). As illustrated in this example, one or more of database clients 350a-350n may access a database head node 320 (e.g., head node 320a, head node 320b, or head node 320c, each of which is a component of a respective database instance) via network 360 (e.g., these components may be network-addressable and accessible to the database clients 350a-350n). However, distributed storage service 310, which may be employed by the database system to store data pages of one or more databases (and redo log records and/or other metadata associated therewith) on behalf of database clients 350a-350n, and to perform other functions of the database system as described herein, may or may not be network-addressable and accessible to the storage clients 350a-350n, in different embodiments. For example, in some embodiments, distributed storage service 310 may perform various storage, access, change logging, recovery, log record manipulation, on-demand data page generation, and/or space management operations in a manner that is invisible to storage clients 350a-350n.

As previously noted, each database instance may include a single database engine head node 320 that receives requests (e.g., a snapshot request, etc.) from various client programs (e.g., applications) and/or subscribers (users), then parses them, optimizes them, and develops an execution plan to carry out the associated database operation(s). In at least some embodiments, data base engine head node may implement the techniques described below with regard to FIGS. 5 and 11, to determine and indicate a version threshold for servicing requests for data pages. In the example illustrated in FIG. 3, a query parsing, optimization, and execution component 305 of database engine head node 320a may perform these functions for queries that are received from database client 350a and that target the database instance of which database engine head node 320a is a component. In some embodiments, query parsing, optimization, and execution component 305 may return query responses to database client 350a, which may include write acknowledgements, requested data pages (or portions thereof), error messages, and or other responses, as appropriate. As illustrated in this example, database engine head node 320a may also include a client-side storage service driver 325, which may route read requests and/or redo log records to various storage nodes within distributed storage service 310, receive write acknowledgements from distributed storage service 310, receive requested data pages from distributed storage service 310, and/or return data pages, error messages, or other responses to query parsing, optimization, and execution component 305 (which may, in turn, return them to database client 350a). Client-side storage service driver 325 may, in some embodiments, determine whether a write quorum requirement for a log record or other write request is met.

In this example, database engine head node 320a includes a data page cache 335, in which data pages that were recently accessed may be temporarily held. As illustrated in FIG. 3, database engine head node 320a may also include a transaction and consistency management component 330, which may be responsible for providing transactionality and consistency in the database instance of which database engine head node 320a is a component. For example, this component may be responsible for ensuring the Atomicity, Consistency, and Isolation properties of the database instance and the transactions that are directed that the database instance. As illustrated in FIG. 3, database engine head node 320a may also include a transaction log 340 and an undo log 345, which may be employed by transaction and consistency management component 330 to track the status of various transactions and roll back any locally cached results of transactions that do not commit.

Note that each of the other database engine head nodes 320 illustrated in FIG. 3 (e.g., 320b and 320c) may include similar components and may perform similar functions for queries received by one or more of database clients 350a-350n and directed to the respective database instances of which it is a component.

In some embodiments, the distributed storage systems described herein may organize data in various logical volumes, segments, and pages for storage on one or more storage nodes. For example, in some embodiments, each database is represented by a logical volume, and each logical volume is segmented over a collection of storage nodes.

Each segment, which lives on a particular one of the storage nodes, contains a set of contiguous block addresses. In some embodiments, each data page is stored in a segment, such that each segment stores a collection of one or more data pages and a change log (also referred to as a redo log) (e.g., a log of redo log records) for each data page that it stores. As discussed below with regard to FIG. 7, the storage nodes may be configured to receive redo log records (which may also be referred to herein as ULRs), write them to memory for performing memory-based on-demand data page generation, and to coalesce them to create new versions of the corresponding data pages and/or additional or replacement log records (e.g., as may be optimally efficient in the background). In some embodiments, data pages and/or change logs may be mirrored across multiple storage nodes, according to a variable configuration, such as in a protection group (which may be specified by the client on whose behalf the databases are being maintained in the database system). For example, in different embodiments, one, two, or three copies of the data or change logs may be stored in each of one, two, or three different availability zones or regions, according to a default configuration, an application-specific durability preference, or a client-specified durability preference.

As used herein, the following terms may be used to describe the organization of data by a distributed storage service as discussed with regard to FIGS. 2-8, according to various embodiments. Note, that for other embodiments of data stores implementing memory-based on-demand data page generation, these terms may serve merely as examples.

Volume: A volume is a logical concept representing a highly durable unit of storage that a user/client/application of the storage system understands. More specifically, a volume is a distributed store that appears to the user/client/application as a single consistent ordered log of write operations to various user pages of a database. Each write operation may be encoded in a User Log Record (ULR), which represents a logical, ordered mutation to the contents of a single user page within the volume. As noted above, a ULR may also be referred to herein as a redo log record. Each ULR may include a unique identifier (e.g., a Logical Sequence Number (LSN)). Each ULR may be persisted to one or more synchronous segments in the distributed store that form a Protection Group (PG), to provide high durability and availability for the ULR. A volume may provide an LSN-type read/write interface for a variable-size contiguous range of bytes.

In some embodiments, a volume may consist of multiple extents, each made durable through a protection group, such as described below with regard to FIG. 8. In such embodiments, a volume may represent a unit of storage composed of a mutable contiguous sequence of Volume Extents. Reads and writes that are directed to a volume may be mapped into corresponding reads and writes to the constituent volume extents. In some embodiments, the size of a volume may be changed by adding or removing volume extents from the end of the volume.

Segment: A segment is a limited-durability unit of storage assigned to a single storage node. More specifically, a segment provides limited best-effort durability (e.g., a persistent, but non-redundant single point of failure that is a storage node) for a specific fixed-size byte range of data. This data may in some cases be a mirror of user-addressable data, or it may be other data, such as volume metadata or erasure coded bits, in various embodiments. A given segment may live on exactly one storage node. Within a storage node, multiple segments may live on each SSD, and each segment may be restricted to one SSD (e.g., a segment may not span across multiple SSDs). In some embodiments, a segment may not be required to occupy a contiguous region on an SSD; rather there may be an allocation map in each SSD describing the areas that are owned by each of the segments. As noted above, a protection group may consist of multiple segments spread across multiple storage nodes. In some embodiments, a segment may provide an LSN-type read/write interface for a fixed-size contiguous range of bytes (where the size is defined at creation). In some embodiments, each segment may be identified by a Segment UUID (e.g., a universally unique identifier of the segment).

Storage page: A storage page is a block of memory, generally of fixed size. In some embodiments, each page is a block of memory (e.g., of virtual memory, disk, or other physical memory) of a size defined by the operating system, and may also be referred to herein by the term "data block". More specifically, a storage page may be a set of contiguous sectors. It may serve as the unit of allocation in SSDs, as well as the unit in log pages for which there is a header and metadata. In some embodiments, and in the context of the database systems described herein, the term "page" or "storage page" may refer to a similar block of a size defined by the database configuration, which may typically be a multiple of 2, such as 4096, 8192, 16384, or 32768 bytes.

Log page: A log page is a type of storage page that is used to store log records (e.g., redo log records or undo log records). In some embodiments, log pages may be identical in size to storage pages. Each log page may include a header containing metadata about that log page, e.g., metadata identifying the segment to which it belongs. Note that a log page is a unit of organization and may not necessarily be the unit of data included in write operations. For example, in some embodiments, during normal forward processing, write operations may write to the tail of the log one sector at a time.

Log Records: Log records (e.g., the individual elements of a log page) may be of several different classes. For example, User Log Records (ULRs), which are created and understood by users/clients/applications of the storage system, may be used to indicate changes to user data in a volume. Control Log Records (CLRs), which are generated by the storage system, may contain control information used to keep track of metadata such as the current unconditional volume durable LSN (VDL). Null Log Records (NLRs) may in some embodiments be used as padding to fill in unused space in a log sector or log page. In some embodiments, there may be various types of log records within each of these classes, and the type of a log record may correspond to a function that needs to be invoked to interpret the log record. For example, one type may represent all the data of a user page in compressed format using a specific compression format; a second type may represent new values for a byte range within a user page; a third type may represent an increment operation to a sequence of bytes interpreted as an integer; and a fourth type may represent copying one byte range to another location within the page. In some embodiments, log record types may be identified by GUIDs (rather than by integers or enums), which may simplify versioning and development, especially for ULRs.

Payload: The payload of a log record is the data or parameter values that are specific to the log record or to log records of a particular type. For example, in some embodiments, there may be a set of parameters or attributes that most (or all) log records include, and that the storage system itself understands. These attributes may be part of a common log record header/structure, which may be relatively small compared to the sector size. In addition, most log records may include additional parameters or data specific to that log record type, and this additional information may be considered the payload of that log record. In some embodiments, if the payload for a particular ULR is larger than the user page size, it may be replaced by an absolute ULR (an AULR) whose payload includes all the data for the user page. This may enable the storage system to enforce an upper limit on the size of the payload for ULRs that is equal to the size of user pages.

User pages: User pages are the byte ranges (of a fixed size) and alignments thereof for a particular volume that are visible to users/clients of the storage system. User pages are a logical concept, and the bytes in particular user pages may or not be stored in any storage page as-is. The size of the user pages for a particular volume may be independent of the storage page size for that volume. In some embodiments, the user page size may be configurable per volume, and different segments on a storage node may have different user page sizes. In some embodiments, user page sizes may be constrained to be a multiple of the sector size (e.g., 4 KB), and may have an upper limit (e.g., 64 KB). The storage page size, on the other hand, may be fixed for an entire storage node and may not change unless there is a change to the underlying hardware.

Storage node: A storage node is a single virtual machine that on which storage node server code is deployed. Each storage node may contain multiple locally attached SSDs, and may provide a network API for access to one or more segments. In some embodiments, various nodes may be on an active list or on a degraded list (e.g., if they are slow to respond or are otherwise impaired, but are not completely unusable). In some embodiments, the client-side driver may assist in (or be responsible for) classifying nodes as active or degraded, for determining if and when they should be replaced, and/or for determining when and how to redistribute data among various nodes, based on observed performance.

SSD: As referred to herein, the term "SSD" may refer to a local block storage volume as seen by the storage node, regardless of the type of storage employed by that storage volume, e.g., disk, a solid-state drive, a battery-backed RAM, a non-volatile RAM device (e.g., one or more NV-DIMMs) or another type of persistent storage device. An SSD is not necessarily mapped directly to hardware. For example, a single solid-state storage device might be broken up into multiple local volumes where each volume is split into and striped across multiple segments, and/or a single drive may be broken up into multiple volumes simply for ease of management, in different embodiments. In some embodiments, each SSD may store an allocation map at a single fixed location. This map may indicate which storage pages that are owned by particular segments, and which of these pages are log pages (as opposed to data pages). In some embodiments, storage pages may be pre-allocated to each segment so that forward processing may not need to wait for allocation. Any changes to the allocation map may need to be made durable before newly allocated storage pages are used by the segments.

Figure 4:
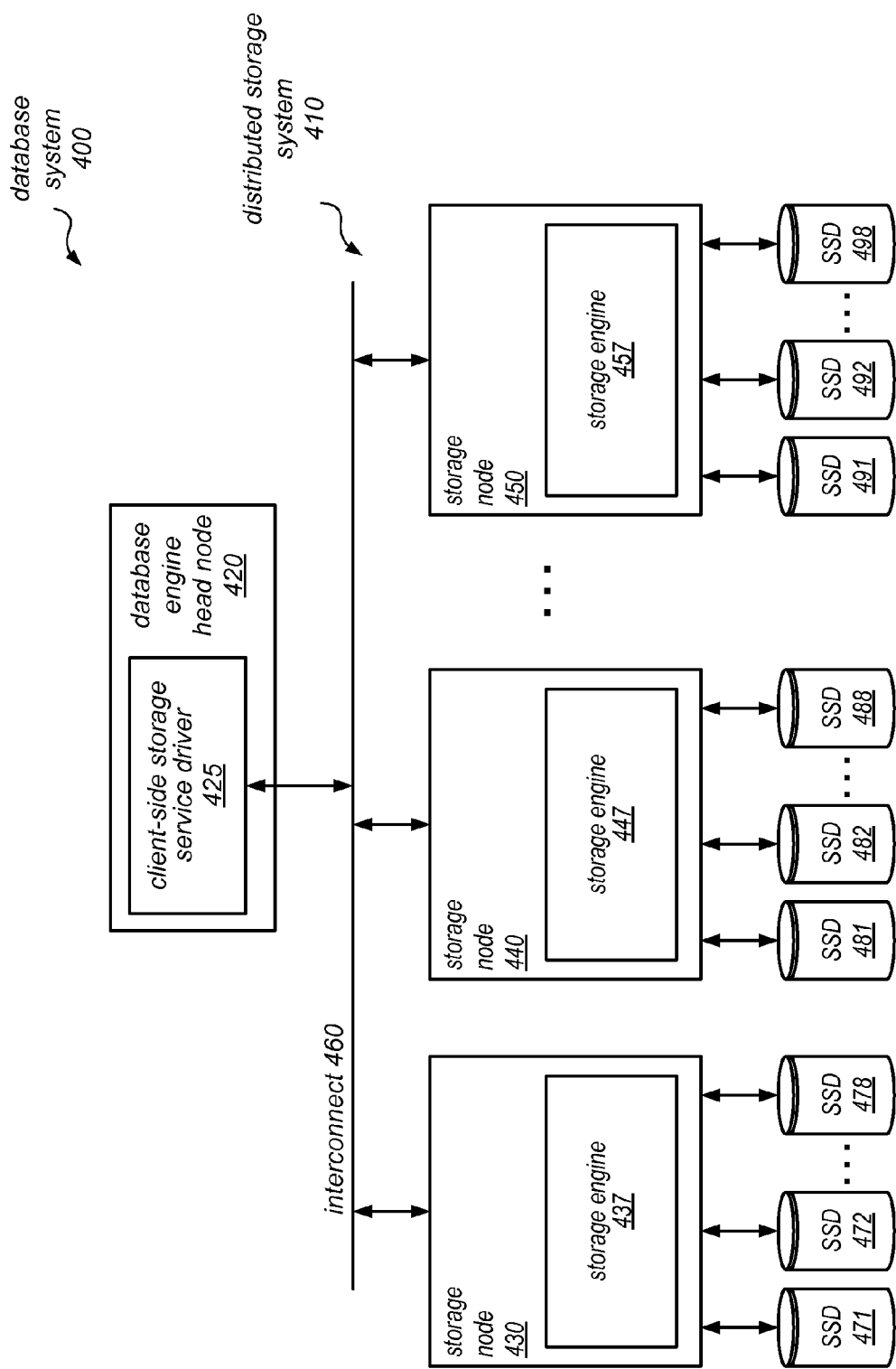
FIG. 4 is a block diagram illustrating a distributed storage system implementing memory-based on-demand data page generation, according to some embodiments.

FIG. 4 is a block diagram illustrating a distributed storage system implementing memory-based on-demand data page generation, according to some embodiments. In at least some embodiments, storage nodes 430-450 may store data for different storage clients as part of a multi-tenant storage service. For example, the various segments discussed above may correspond to different protection groups and volumes for different clients. In some embodiments, a database system 400 may be a client of distributed storage system 410, which communicates with a database engine head node 420 over interconnect 460. As in the example illustrated in FIG. 3, database engine head node 420 may include a client-side storage service driver 425. In this example, distributed storage system 410 includes multiple storage system server nodes (including those shown as 430, 440, and 450), each of which includes storage for data pages and redo logs for the segment(s) it stores, and hardware and/or software configured to perform various segment management functions. For example, each storage node may include hardware and/or software configured to perform at least a portion of any or all of the following operations: data page generation (applying redo log records maintained in system memory at the replication (locally, e.g., within the storage node), coalescing of redo logs to generate/update data pages, snapshots (e.g., creating, restoration, deletion, etc.), log management (e.g., manipulating log records), crash recovery, and/or space management (e.g., for a segment). Each storage system server node may also have multiple attached storage devices (e.g., SSDs) on which data blocks may be stored on behalf of clients (e.g., users, client applications, and/or database service subscribers).

In the example illustrated in FIG. 4, storage node 430 includes storage engine 437 which may manage storage of segment data page(s) (in persistent storage), redo log(s) (in memory and persistent storage), segment management functions, and attached SSDs 471-478 (which may provide persistent storage for data pages and log records). Again note that the label "SSD" may or may not refer to a solid-state drive, but may more generally refer to a local block storage volume, regardless of its underlying hardware. Similarly, storage node 440 includes storage engine 447 for managing data page(s), segment redo log(s), segment management functions, and attached SSDs 481-488; and storage node 450 which includes storage engine 457 for managing data page(s), segment redo log(s), segment management functions, and attached SSDs 491-498. For example storage engines 437, 447, and 447 may perform the various techniques described below with regard to FIGS. 7 and 9-12, for memory-based on-demand data page generation, and snapshot access and management.

In some embodiments, each of the storage system server nodes in the distributed storage system may implement a set of processes running on the node server's operating system that manage communication with the database engine head node, e.g., to receive redo logs, send back data pages, etc. In some embodiments, all data blocks written to the distributed storage system may be backed up to long-term and/or archival storage (e.g., in a remote key-value durable backup storage system).

Figure 5:
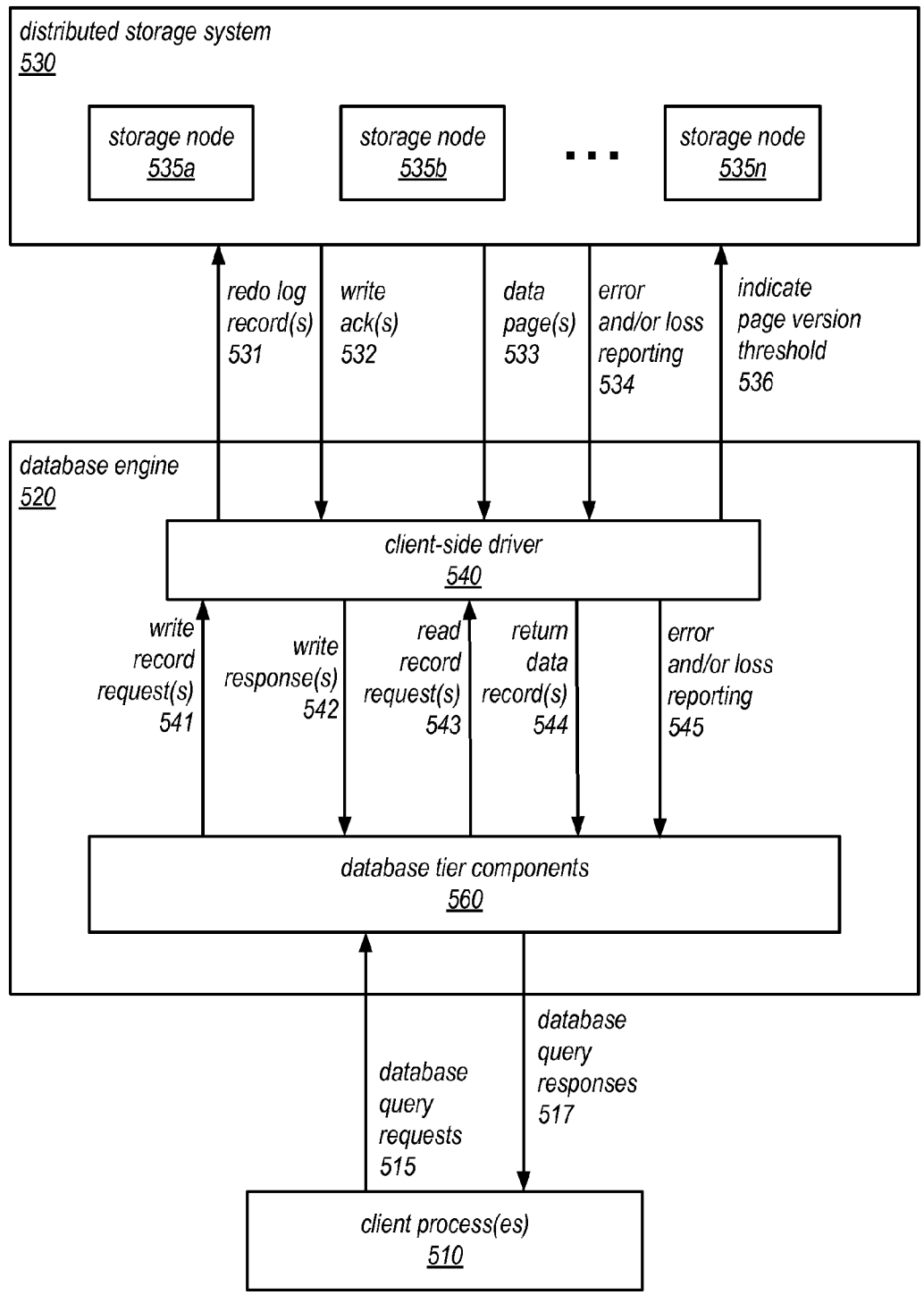
FIG. 5 is a block diagram illustrating the use of a separate distributed storage system in a database system, according to some embodiments.

FIG. 5 is a block diagram illustrating the use of a separate distributed storage system in a database system, according to one embodiment. In this example, one or more client processes 510 may store data to one or more databases maintained by a database system that includes a database engine 520 and a distributed storage system 530. In the example illustrated in FIG. 5, database engine 520 includes database tier components 560 and client-side driver 540 (which serves as the interface between distributed storage system 530 and database tier components 560). In some embodiments, database tier components 560 may perform functions such as those performed by query parsing, optimization and execution component 305 and transaction and consistency management component 330 of FIG. 3, and/or may store data pages, transaction logs and/or undo logs (such as those stored by data page cache 335, transaction log 340 and undo log 345 of FIG. 3).

In this example, one or more client processes 510 may send database query requests 515 (which may include read and/or write requests targeting data stored on one or more of the storage nodes 535a-535n) to database tier components 560, and may receive database query responses 517 from database tier components 560 (e.g., responses that include write acknowledgements and/or requested data). Each database query request 515 that includes a request to write to a data page may be parsed and optimized to generate one or more write record requests 541, which may be sent to client-side driver 540 for subsequent routing to distributed storage system 530. In this example, client-side driver 540 may generate one or more redo log records 531 corresponding to each write record request 541, and may send them to specific ones of the storage nodes 535 of distributed storage system 530. Client-side driver 540 may determine which storage nodes to send redo log records in a particular protection group. For example, instead of sending a redo log record 531 to all storage nodes in a protection group, the redo log record may be sent to one, two, or any other subset of storage nodes in the protection group, thus saving network bandwidth directed toward distributed storage system 530. Client-side driver 540 may also determine when to send redo log records to additional storage nodes that were not previously sent the redo log record (such as in response to detecting that a pending write time for a log record has exceeded a latency threshold).

Distributed storage system 530 may return a corresponding write acknowledgement 523 for each redo log record 531 to database engine 520 (specifically to client-side driver 540). Client-side driver 540 may pass these write acknowledgements to database tier components 560 (as write responses 542), which may then send corresponding responses (e.g., write acknowledgements) to one or more client processes 510 as one of database query responses 517.

In this example, each database query request 515 that includes a request to read a data page may be parsed and optimized to generate one or more read record requests 543, which may be sent to client-side driver 540 for subsequent routing to distributed storage system 530. In this example, client-side driver 540 may send these requests to specific ones of the storage nodes 535 of distributed storage system 530, and distributed storage system 530 may return the requested data pages 533 to database engine 520 (specifically to client-side driver 540). For example, the requests may indicate particular versions of particular data pages maintained at the storage nodes. Storage nodes 535 may generate the requested version of the data pages on-demand, applying log records maintained in memory at the storage nodes 535 to data pages obtained from persistent storage at the storage node, and sending the generated versions of the data pages 533 back to client-side driver 540. Client-side driver 540 may send the returned data pages to the database tier components 560 as return data records 544, and database tier components 560 may then send the data pages to one or more client processes 510 as database query responses 517.

In some embodiments, various error and/or data loss messages 534 may be sent from distributed storage system 530 to database engine 520 (specifically to client-side driver 540). These messages may be passed from client-side driver 540 to database tier components 560 as error and/or loss reporting messages 545, and then to one or more client processes 510 along with (or instead of) a database query response 517.

In at least some embodiments, database engine 520 may provide page version threshold indications 536 to distributed storage system 530. For example, as discussed below with regard to FIG. 11, version thresholds for data pages may be determined based on in-flight or outstanding read requests. Database engine 520 track which versions of data pages are being requested (whether from a database engine head node or read replicas of the database) from distributed storage system 530 and send an indication 536 of page version threshold so that at minimum the outstanding read requests may be within the version threshold maintained at distributed storage system 530. For example, if a database engine head node and one or more read replicas have in-flight read requests starting at sequence number 113421, then the determined version threshold may be less than or equal to sequence number 113421. In some embodiments, database engine 520 may also determine a point at which the log maintained in distributed storage system 530 for a data volume is durably complete (e.g., as log records may be received out of order at different storage nodes and/or may not be considered durable until a quorum of storage nodes acknowledges storing the log record). For example, the database engine may track the current point of the log at which the volume is complete and durable among storage nodes 535 and ensure that the page version threshold does not occur at a point in the log sequence later than the completion point.

The page version threshold may, in some embodiments, be indicated as a particular LSN, such as a Minimum Readable Page LSN (MRPL), identifying a point in the sequence of log records prior to which versions of the data pages generated by these earlier log records are not available for reading. Note however, that these log records may still be maintained in system memory and/or persistent storage at a storage node. Additionally, these log records may be stored in a separate data store (e.g., another data storage service, such as a key-value data store) which may be accessed to recreate a state of a volume at a particular point in time. However, unlike the requested versions of data pages within the version threshold (which may be generated and provided on-demand by storage system 530 according to the techniques discussed below), recreating a state of the database based on these backed-up log records may be a time consuming restoration process. As noted earlier, the data volume may be divided into various protection groups that replicate individual segments of volume, and thus when indicating page version threshold 536, database engine 520 may provide indications to each storage node 535 in each protection group for a volume.

In some embodiments, the APIs 531-534 and 536 of distributed storage system 530 and the APIs 541-545 of client-side driver 540 may expose the functionality of the distributed storage system 530 to database engine 520 as if database engine 520 were a client of distributed storage system 530. For example, database engine 520 (through client-side driver 540) may write redo log records or request data pages through these APIs to perform (or facilitate the performance of) various operations of the database system implemented by the combination of database engine 520 and distributed storage system 530 (e.g., storage, access, change logging, recovery, and/or space management operations). As illustrated in FIG. 5, distributed storage system 530 may store data blocks on storage nodes 535a-535n, each of which may have multiple attached SSDs. In some embodiments, distributed storage system 530 may provide high durability for stored data block through the application of various types of redundancy schemes.

Note that in various embodiments, the API calls and responses between database engine 520 and distributed storage system 530 (e.g., APIs 531-534 and 536) and/or the API calls and responses between client-side driver 540 and database tier components 560 (e.g., APIs 541-545) in FIG. 5 may be performed over a secure proxy connection (e.g., one managed by a gateway control plane), or may be performed over the public network or, alternatively, over a private channel such as a virtual private network (VPN) connection. These and other APIs to and/or between components of the database systems described herein may be implemented according to different technologies, including, but not limited to, Simple Object Access Protocol (SOAP) technology and Representational state transfer (REST) technology. For example, these APIs may be, but are not necessarily, implemented as SOAP APIs or RESTful APIs. SOAP is a protocol for exchanging information in the context of network-based services. REST is an architectural style for distributed hypermedia systems. A RESTful API (which may also be referred to as a RESTful network-based service) is a network-based service API implemented using HTTP and REST technology. The APIs described herein may in some embodiments be wrapped with client libraries in various languages, including, but not limited to, C, C++, Java, C# and Perl to support integration with database engine 520 and/or distributed storage system 530.

Data may be stored at storage nodes using a number of different techniques. A variety of different allocation models, for instance, may be implemented for an SSD, in different embodiments. For example, in some embodiments, log entry pages and physical application pages may be allocated from a single heap of pages associated with an SSD device. This approach may have the advantage of leaving the relative amount of storage consumed by log pages and data pages to remain unspecified and to adapt automatically to usage. It may also have the advantage of allowing pages to remain unprepared until they are used, and repurposed at will without preparation. In other embodiments, an allocation model may partition the storage device into separate spaces for log entries and data pages. Once such allocation model is illustrated by the block diagram in FIG. 6 and described below.

Figure 6:
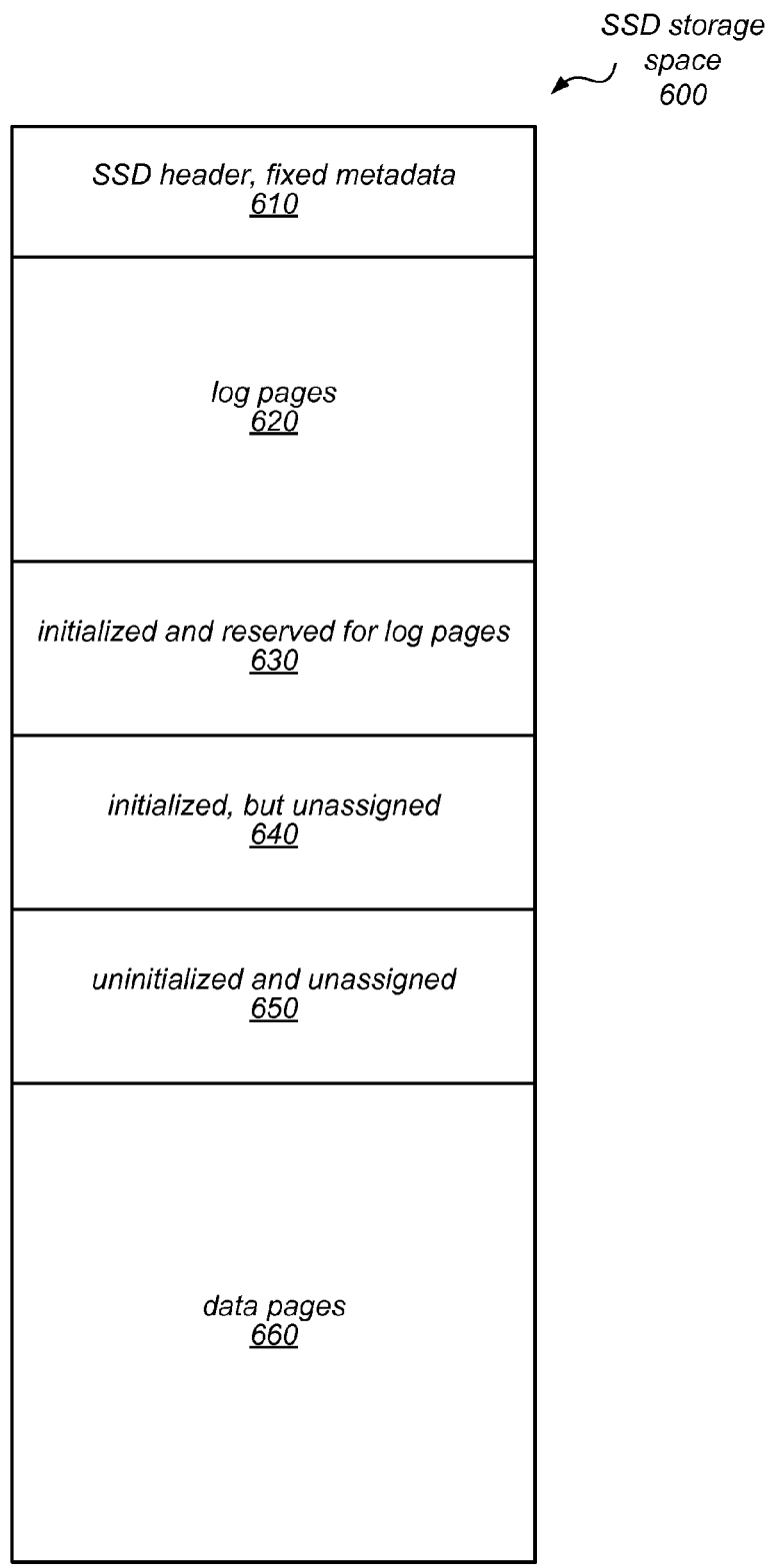
FIG. 6 is a block diagram illustrating how data and metadata may be persistently stored on a given node of a distributed storage system, according to some embodiments.

FIG. 6 is a block diagram illustrating how data and metadata may be persistently stored on a given storage node (or persistent storage device) of a distributed storage system, according to one embodiment. In this example, SSD storage space 600 stores an SSD header and other fixed metadata in the portion of the space labeled 610. It stores log pages in the portion of the space labeled 620, and includes a space labeled 630 that is initialized and reserved for additional log pages. One portion of SSD storage space 600 (shown as 640) is initialized, but unassigned, and another portion of the space (shown as 650) is uninitialized and unassigned. Finally, the portion of SSD storage space 600 labeled 660 stores data pages. In this example, the first usable log page slot, the last used log page slot (ephemeral), the last reserved log page slot, the last usable log page slot, and the first used data page slot (ephemeral) within SSD storage space 600 may be identified by a respective pointer.

In allocation approach illustrated in FIG. 6, valid log pages may be packed into the beginning of the flat storage space. Holes that open up due to log pages being freed may be reused before additional log page slots farther into the address space are used. For example, in the worst case, the first n log page slots contain valid log data, where n is the largest number of valid log pages that have ever simultaneously existed. In this example, valid data pages may be packed into the end of the flat storage space. Holes that open up due to data pages being freed may be reused before additional data page slots lower in the address space are used. For example, in the worst case, the last m data pages contain valid data, where m is the largest number of valid data pages that have ever simultaneously existed.

In some embodiments, before a log page slot can become part of the potential set of valid log page entries, it may need to be initialized to a value that cannot be confused for a valid future log entry page. This is implicitly true for recycled log page slots, since a retired log page has enough metadata to never be confused for a new valid log page. However, when a storage device is first initialized, or when space is reclaimed that had potentially been used to store application data pages, the log page slots may need to be initialized before they are added to the log page slot pool. In some embodiments, rebalancing/reclaiming log space may be performed as a background task.

In the example illustrated in FIG. 6, the current log page slot pool includes the area between the first usable log page slot and the last reserved log page slot. In some embodiments, this pool may safely grow up to last usable log page slot without re-initialization of new log page slots (e.g., by persisting an update to the pointer that identifies the last reserved log page slot). In this example, beyond the last usable log page slot, the pool may grow up to the first used data page slot by persisting initialized log page slots and persistently updating the pointer for the last usable log page slot. In this example, the previously uninitialized and unassigned portion of the SSD storage space 600 shown as 650 may be pressed into service to store log pages. In some embodiments, the current log page slot pool may be shrunk down to the position of the last used log page slot (which is identified by a pointer) by persisting an update to the pointer for the last reserved log page slot.

In the example illustrated in FIG. 6, the current data page slot pool includes the area between the last usable log page slot and the end of SSD storage space 600. In some embodiments, the data page pool may be safely grown to the position identified by the pointer to the last reserved log page slot by persisting an update to the pointer to the last usable log page slot. In this example, the previously initialized, but unassigned portion of the SSD storage space 600 shown as 640 may be pressed into service to store data pages. Beyond this, the pool may be safely grown to the position identified by the pointer to the last used log page slot by persisting updates to the pointers for the last reserved log page slot and the last usable log page slot, effectively reassigning the portions of SSD storage space 600 shown as 630 and 640 to store data pages, rather than log pages. In some embodiments, the data page slot pool may be safely shrunk down to the position identified by the pointer to the first used data page slot by initializing additional log page slots and persisting an update to the pointer to the last usable log page slot.

In embodiments that employ the allocation approach illustrated in FIG. 6, page sizes for the log page pool and the data page pool may be selected independently, while still facilitating good packing behavior. In such embodiments, there may be no possibility of a valid log page linking to a spoofed log page formed by application data, and it may be possible to distinguish between a corrupted log and a valid log tail that links to an as-yet-unwritten next page. In embodiments that employ the allocation approach illustrated in FIG. 6, at startup, all of the log page slots up to the position identified by the pointer to the last reserved log page slot may be rapidly and sequentially read, and the entire log index may be reconstructed (including inferred linking/ordering). In such embodiments, there may be no need for explicit linking between log pages, since everything can be inferred from LSN sequencing constraints.

Figure 7:
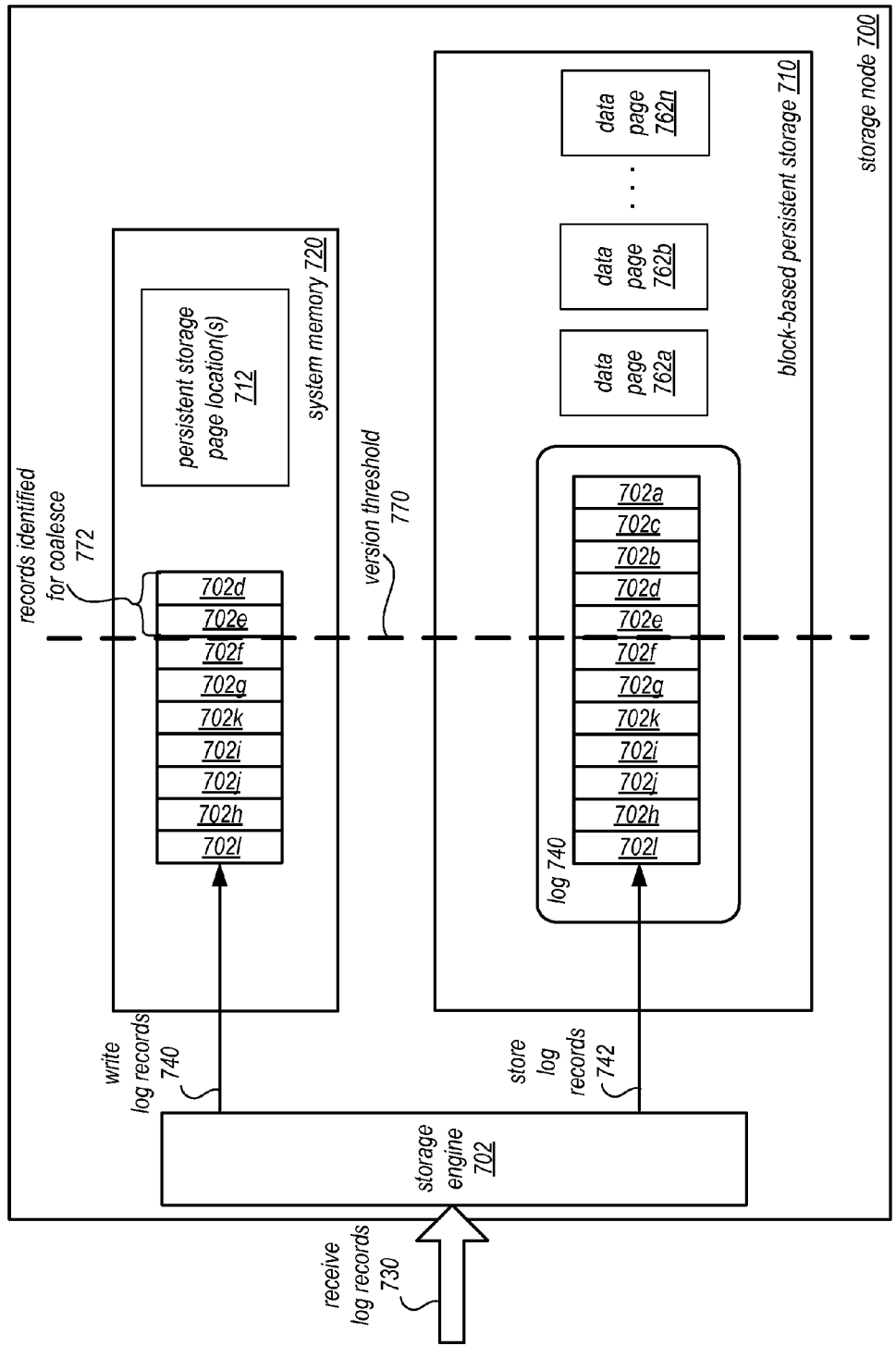
FIG. 7 is a block dataflow diagram illustrating how log records may be stored on a given node of a distributed storage system, according to some embodiments.

In addition to storing log records and data pages in persistent storage, as discussed above with regard to FIG. 6, log records may be maintained in system memory at a storage node (e.g., such as system memory 2020 in FIG. 13) for performing memory-based on-demand data page generation. FIG. 7 is a block dataflow diagram illustrating how log records may be stored on a given node of a distributed storage system, according to some embodiments. As indicated at 730, a storage node may receive log record(s) 730, such as the redo log records discussed above. These log records may be stored 742 in block-based persistent storage 710 (which may be one or more of the various SSDs discussed above) as part of a log 740 maintained for the data pages 762 stored at storage node 710 for the volume. Log records may be persistently stored as they are received, which may be in near log sequence, but may not be in exact log sequence. For example, in log 740 log records may be stored 702a, 702c, then 702b (even though in log sequence order log record 702c may come after log record 702b). When obtaining log records from log 740 (e.g., to generate a snapshot, create data pages, etc. . . . ), log 740 may be scanned, evaluating the various log pages to obtain the desired log records even though the log records may not necessarily be exactly in sequence. Storage space for log records may be eventually reclaimed. In at least some embodiments, log records may be reclaimed that occur after the point in the log identified as the version threshold 770. However, in at least some embodiments, log records may not be immediately reclaimed, but may be retained in persistent storage even after coalesce operations have been performed to update the data pages linked to the log records. At some later point, such as a reclamation point in the log sequence, storage space for the log records may be reclaimed.

Log records may also be written 740 to system memory 720 at storage node 720, where they may be maintained according to version threshold 770. Version thresholds may indicate the minimum readable version at which data pages may be generated in response to data page requests. Log records that occur at point in the log sequence prior to the version threshold 770 may describe a version of the data page which may not be available for requests. Note that log records may not immediately be removed from system memory 720 after version threshold 770. Instead, the log records may be identified for coalesce 772 (allowing coalesce operations for the data pages linked to the identified log records to be optimally scheduled and performed) as discussed below with regard to FIG. 11. In some embodiments, persistent storage page locations 712 may be maintained in system memory 720. For example, an address or pointer to each data page 762 may be maintained so that when a data page version is generated, a lookup on the data page may be performed in system memory without performing a search on block-based persistent storage 710 to find the desired data page. In some embodiments, persistent storage page location(s) may include locations that correspond to one or more snapshots of prior versions of the database, such as discussed below with regard to FIG. 12.

Figure 8:
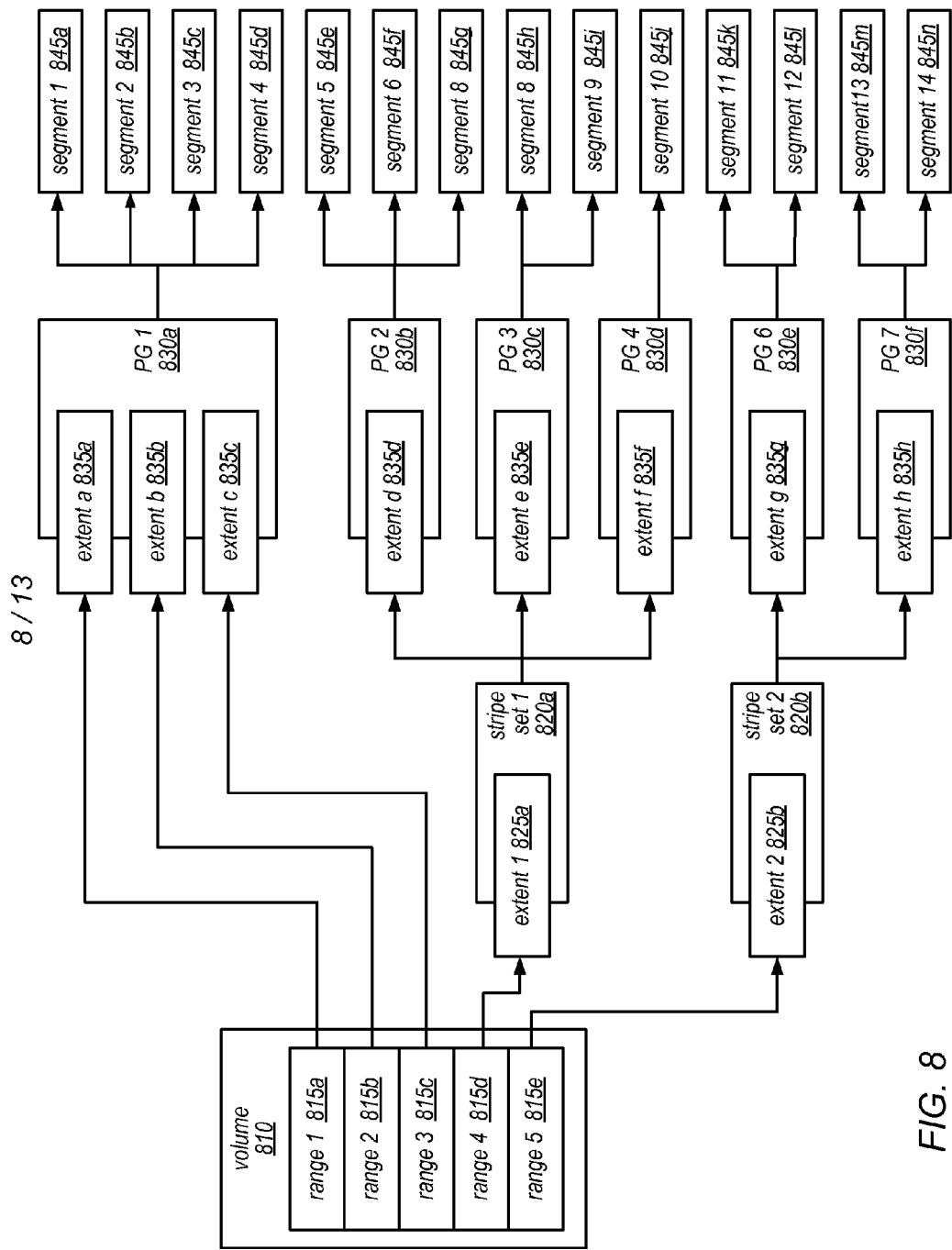
FIG. 8 is a block diagram illustrating an example configuration of a database volume, according to some embodiments.

FIG. 8 is a block diagram illustrating an example configuration of a database volume 810, according to one embodiment. In this example, data corresponding to each of various address ranges 815 (shown as address ranges 815a-815e) is stored as different segments 845 (shown as segments 845a-845n). More specifically, data corresponding to each of various address ranges 815 may be organized into different extents (shown as extents 825a-825b, and extents 835a-835h), and various ones of these extents may be included in different protection groups 830 (shown as 830a-830f), with or without striping (such as that shown as stripe set 820a and stripe set 820b). In this example, protection group 1 illustrates the use of erasure coding. In this example, protection groups 2 and 3 and protection groups 6 and 7 represent mirrored data sets of each other, while protection group 4 represents a single-instance (non-redundant) data set. In this example, protection group 8 represents a multitier protection group that combines other protection groups (e.g., this may represent a multi-region protection group). In this example, stripe set 1 (820a) and stripe set 2 (820b) illustrates how extents (e.g., extents 825a and 825b) may be striped into a volume, in some embodiments.

More specifically, in this example, protection group 1 (830a) includes extents a-c (835a-835c), which include data from ranges 1-3 (815a-815c), respectively, and these extents are mapped to segments 1-4 (845a-845d). Protection group 2 (830b) includes extent d (835d), which includes data striped from range 4 (815d), and this extent is mapped to segments 5-7 (845e-845g). Similarly, protection group 3 (830c) includes extent e (835e), which includes data striped from range 4 (815d), and is mapped to segments 8-9 (845h-845i); and protection group 4 (830d) includes extent f (835f), which includes data striped from range 4 (815d), and is mapped to segment 10 (845j). In this example, protection group 6 (830e) includes extent g (835g), which includes data striped from range 5 (815e), and is mapped to segments 11-12 (845k-845l); and protection group 7 (830f) includes extent h (835h), which also includes data striped from range 5 (815e), and is mapped to segments 13-14 (845m-845n).

Figure 9:
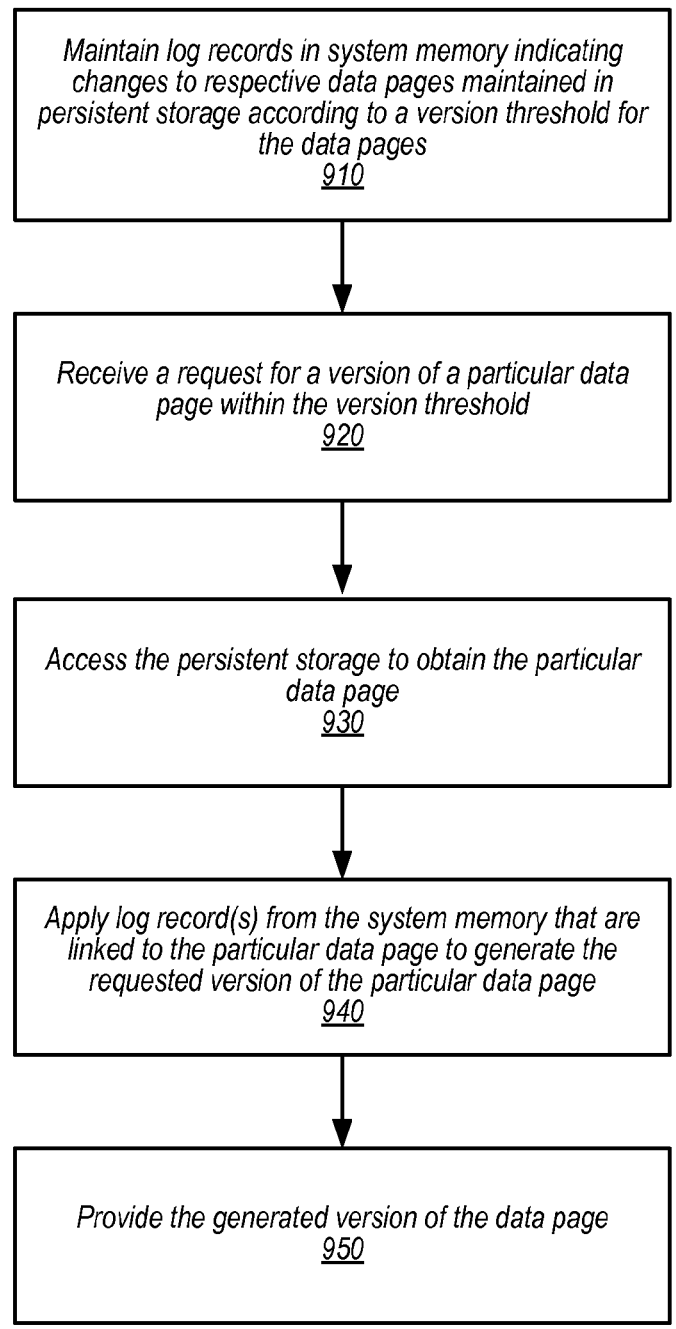
FIG. 9 is a high-level flowchart illustrating various methods and techniques for memory-based on-demand data page generation, according to some embodiments.

FIGS. 2-8 discussed above provide various examples of a distributed database service and distributed storage service that may implement memory-based on-demand data page generation. FIG. 9 is a high-level flowchart illustrating various methods and techniques for memory-based on-demand data page generation, according to some embodiments. Many of the examples below may be performed using various embodiments of a distributed storage system as described above with respect to FIGS. 2-8. Various components of the systems described above, such as a component of a storage node 430, may be configured to perform the various techniques described below with regard to FIGS. 9-12. However, other configurations of distributed storage systems, or clients thereof may be implemented. Moreover, any other system, such as one of the various components of computer system 2000 described below with regard to FIG. 13, may also implement the techniques described herein to perform memory-based on-demand data page generation, and as such, the following discussion is not to be construed as limiting to any one of the multiple examples given. For example, a log-structured storage system performing memory-based on-demand data page generation may, in some embodiments, be implemented as part of a file system. Various changes, updates, or manipulations to the files of the file system may be persisted as log records describing changes to various pages for data (or metadata) of the file system.

As indicated at 910, log records may be maintained in system memory that indicated changes to respective data pages maintained in persistent storage according to a version threshold for data pages in the persistent storage, in various embodiments. Log records maintained in system memory may be one of many different log record types. For example, a redo log record type may be implemented that describes various changes, modifications, or updates to a data page persistently stored for a database. However, in some embodiments, various other types of log records may be maintained indicating changes to data pages persistently maintained as part of a data store, and thus the previous example is not intended to be limiting. Log records may be maintained in system memory according to a version threshold for the data pages. The version threshold may indicate a minimum readable version of data pages which may be available to a storage client for reading. Log records in system memory describing changes to data pages that are not within the version threshold may be scheduled for coalesce operations (to update the data pages to include the changes described) after which space in the system memory maintaining the excluded log records may be reclaimed (as their changes are already captured in the updated data page), in some embodiments.

As indicated at 920, a request for a version of a particular data page may be received, in various embodiments. The requested version for the data page may be within the version threshold. For example, the requested version may be associated with a log sequence number that is higher than a log sequence number indicating the version threshold. As discussed above with regard to FIG. 5, in at least some embodiments, the storage client may determine the version threshold, and may ensure that all requests to the storage system are within the version threshold. However, in some embodiments, a data store may deny a request for a version that is not within a version threshold. In some embodiments, the request for the particular version may be specified by a storage client. In some embodiments, the data store may by default return a current version of the data page (and thus the requested version may not be specified by a storage client).

In response to receiving the request, the block-based persistent storage may be accessed to obtain the particular data page, as indicated at 930, in various embodiments. For example, data page storage locations may be maintained in system memory, and a lookup operation may be performed to identify the block address or range of block addresses of the data page to obtain from persistent storage. Log record(s) in the system memory that are linked to the particular data page may then be applied to the particular data page obtained from persistent storage to generate the requested version of the particular data page, as indicated at 940. For example, the log records may be replayed, performing the various changes indicated to the data page so that after the log record(s) are applied, the requested version of the data page is determined. In at least some embodiments, the requested version of the data page may not be the current version of the data page, therefore not all log record(s) that are linked to the particular data page may be applied. The generated version of the data page may then be provided, as indicated at 950, in response to the request (e.g., sent to the database engine node as discussed above, or passed back to the calling application or system that requested the version of the particular data page, such as a file system).

In addition to providing on-demand generation of data pages, the log records maintained in system memory may be utilized to provide various other kinds of information or metadata to storage clients, and other systems. For example, if a storage client experiences a failure and wishes to determine the most recent log record acknowledged as durably stored in the data store, the response may be provided simply by reading the log records maintained in system memory, without an I/O operation to persistent storage. In another example, a data store may be distributed, implementing multiple storage nodes that maintain a replica of data, such as the protection groups discussed above with regard to FIG. 8. The log records may be sent to other storage nodes that request them (e.g., in order to fill in gaps, update, or reconstruct a replica of the data at another storage node). By maintaining the log records in system memory, the number of I/O operations to a persistent copy of the log records in persistent storage may be reduced, which in turn may significantly increase the speed/throughput at which data pages can be generated, and other requests that utilize log records can be serviced at a data store. For example, even though two different data pages may have a large difference in the number of log records linked to the two data pages, the time to generate a version of the data pages within the version threshold may be the same, as each generation may only require a single I/O operation to obtain the data page from persistent storage.

In some embodiments, in the event of a failure or loss of data in system memory (e.g., storage node failure, restart, etc. . . . ), the log records may be restored to system memory from a persistently stored log including the log records in persistent storage.

Figure 10:
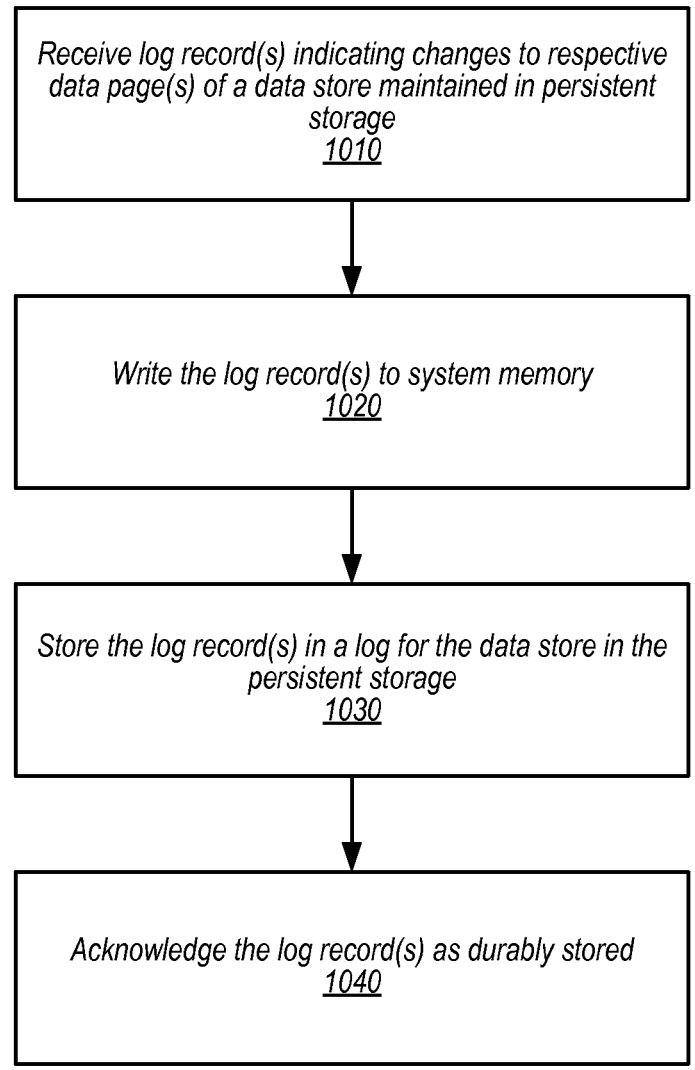
FIG. 10 is a high-level flowchart illustrating various methods and techniques for storing log records at a data store, according to some embodiments.

FIG. 10 is a high-level flowchart illustrating various methods and techniques for storing log records at a data store, according to some embodiments. As indicated at 1010, log record(s) indicating changes to respective data page(s) of a data store maintained in persistent storage may be received. For example, a storage client may send the log records describing the changes to the data store, as discussed above with regard to FIGS. 2-8. In some embodiments, storage clients may communicate the desired data page changes, and a storage engine or other data store component may generate the log record(s). The log record(s) may be written to system memory, as indicated at 1020, in various embodiments. The log record(s) may be written as they are received, so that the log record(s) may or may not be stored in sequential order (e.g., according to LSN). As indicated at 1030, the log record(s) may also be stored in a log for the data store in persistent storage, in at least some embodiments. As illustrated above in FIG. 7, log records may be written to a log maintained in a persistent storage device. The log records may be appended to a log portion of the storage device allocated to the log, in some embodiments. As indicated at 1040, the log record(s) may then be acknowledged as durably stored. For example, a confirmation or acknowledgement may be provided to a storage client.

Figure 11:
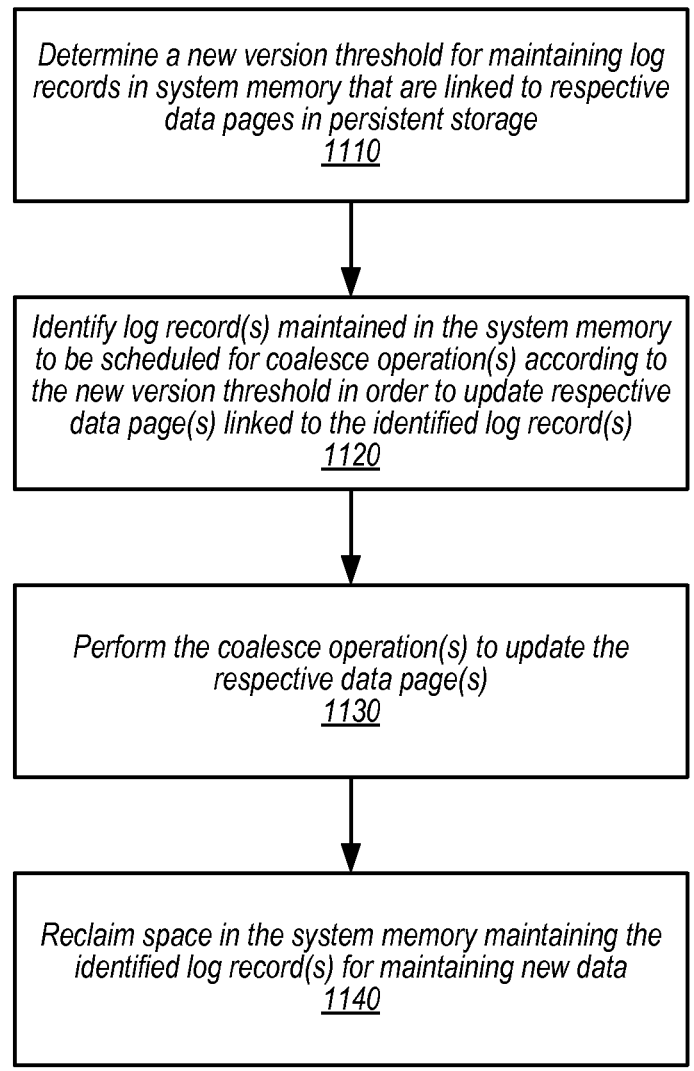
FIG. 11 is a high-level flowchart illustrating various methods and techniques for determining a new version threshold, according to some embodiments.

As noted above, log records may be maintained in system memory according to a version threshold for data pages. The version threshold, and changes to the version threshold, may thus determine which log records are retained in system memory, and which may be reclaimed for storing new log records or other data. FIG. 11 is a high-level flowchart illustrating various methods and techniques for determining a new version threshold, according to some embodiments. As indicated at 1110, a new version threshold for maintaining log records in system memory that are linked to respective data pages in persistent storage may be determined. Determining a new version threshold may be performed in different ways, which may be dependent upon the storage client utilizing the data store. For example, as discussed above with regard to FIGS. 2-8, a database system may utilize the data store and may desire to read data pages at different data page versions. Thus, the version threshold may be determined based on the versions at which the database system still needs to service requests to read certain data pages. In some embodiments, the version threshold may be determined based the capacity of the system memory to hold more log records. For example, the data store, not the storage client, may indicate or determine the version threshold at which different versions of data pages may be read, in some embodiments. Thus the version threshold may Once a new version threshold is determined (e.g., advancing the MRPL discussed above to a greater log sequence number), as indicated at 1120, log record(s) maintained in the system memory may be identified to schedule coalesce operation(s) according to the new version threshold. Scheduling coalesce operations may be done so as not to impede the performance of other data store operations, such as generating new versions of data pages in response to requests and storing log records. In at least some embodiments, coalesce operations may be background operations (as opposed to generating new versions of data pages in response to requests and storing log records which may be foreground operations). Thus, coalesce operations may not be immediately performed as a result of a new version threshold being determined.

As indicated at 1130, the coalesce operation(s) may be performed to update the respective data page(s). To perform a coalesce operation for a data page, log records linked to the particular data page may be applied to a current version of the particular data page in persistent storage in order to generate a new version of the data page. Thus, a coalesce operation may combine two more log records. These log records may, for example, describe that the value of the particular data page is 11253 and that the value of the page is to be increased by 5. The generated new version of the particular data page may be to combine these two records and create a new version of the particular data page's value as 11258. A new instance or version of the page may, in some embodiments be a new type of log record stored in a log, such as an AULR described above. This new log record stored in the log may be dependent (e.g., DULR), or independent (e.g., AULR). A new instance or version of the page may, in some embodiments, be a new page stored in a data zone, such as described in FIG. 6. In at least some embodiments, the log records used to generate the new version of the particular data page may remain in persistent storage until some form of storage reclamation, garbage collection, or other restructuring process removes the records from the persistent storage. In some embodiments, page locations maintained in system memory may be updated to reflect new page storage locations for updated data pages (if the updated pages are stored in different locations).

As indicated at 1140, space in the system memory may be reclaimed for maintaining new data in response to performing the coalesce operations, in some embodiments. For example, a memory allocation map of a storage engine may be updated to identify the storage space for the log record(s) as available for storing new log records. In this way, storage space in the system memory for maintaining log records or other data may be managed. If, for instance, the version threshold remains unchanged, the number of log records in system memory may grow. Whereas if the version threshold is frequently advanced, then less log records may be maintained in system memory.

Figure 12:
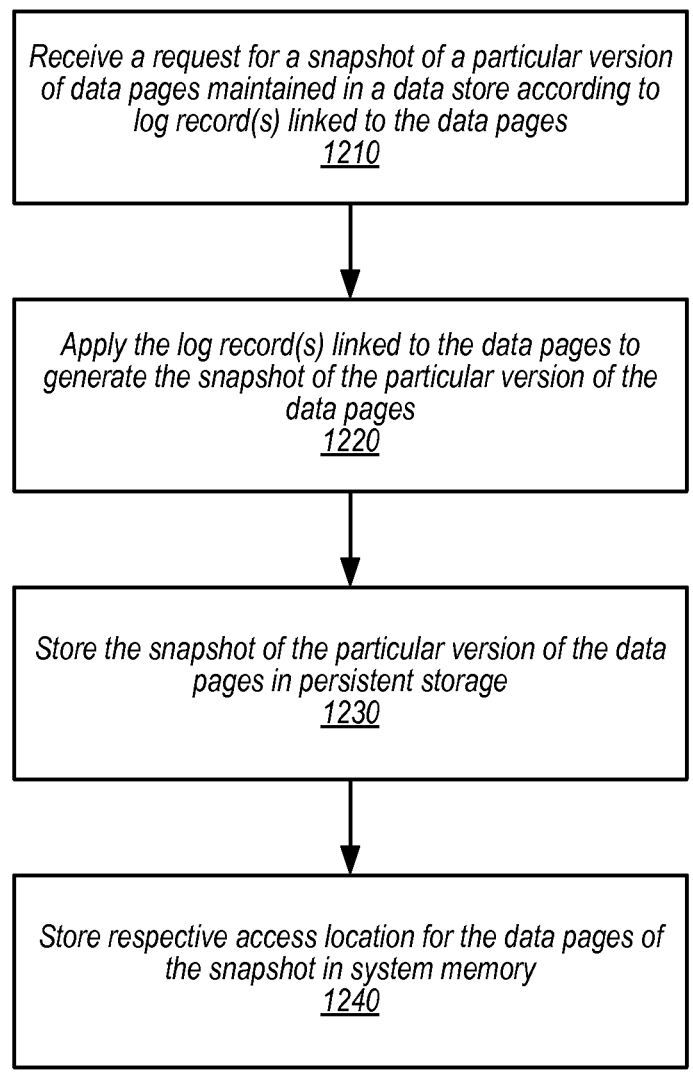
FIG. 12 is a high-level flowchart illustrating various methods and techniques for generating and utilizing a snapshot, according to some embodiments.

Maintaining log records in system memory and generating versions of data pages in system memory may, in some embodiments, allow for the processing and handling of snapshots of data maintained in a data store to be performed via snapshot data page locations maintained in system memory. As noted above, data page versions may be generated by applying log records from system memory to a data page obtained from persistent storage. The data page may be located in persistent storage according page storage locations maintained in system memory. Similarly, data snapshot(s) (e.g., a database volume snapshot) associated with particular versions of each data page may be maintained as data pages in persistent storage, with corresponding locations for the snapshot(s) data pages maintained in system memory. FIG. 12 is a high-level flowchart illustrating various methods and techniques for generating and utilizing a snapshot, according to some embodiments.

As indicated at 1210, a request may be received at a data store for a snapshot of a particular version of data pages maintained in a data store according to log records linked to the data pages. For example, a snapshot creation request may be received that is associated with a particular log sequence number to create a snapshot of the data pages as of the point in time identified by the log sequence number. In at least some embodiments, the snapshot may be created. For example, as indicated at 1220, the log record(s) linked to the data pages may be applied to generate the snapshot of the particular version of the data pages. As with the data page generation techniques discussed above with regard to FIG. 9, a background process may, in some embodiments, be initiated to perform memory-based on demand data page generation for each data page in the requested snapshot at the particular version.

As the particular version of the data pages are generated, the versions of the data pages may be stored in persistent storage in order to store the snapshot of the particular version of the data pages in persistent storage, as indicated at 1230, in some embodiments. The locations of the data pages of the snapshot may be stored in system memory, as indicated at 1240, so that when servicing requests for data pages corresponding to the snapshot, the locations of the pages may be determined via a lookup operation in system memory and a single I/O operation to obtain the data page similar to the on-demand data page generation techniques discussed above.

The methods described herein may in various embodiments be implemented by any combination of hardware and software. For example, in one embodiment, the methods may be implemented by a computer system (e.g., a computer system as in FIG. 13) that includes one or more processors executing program instructions stored on a computer-readable storage medium coupled to the processors. The program instructions may be configured to implement the functionality described herein (e.g., the functionality of various servers and other components that implement the network-based virtual computing resource provider described herein). The various methods as illustrated in the figures and described herein represent example embodiments of methods. The order of any method may be changed, and various elements may be added, reordered, combined, omitted, modified, etc.

Figure 13:
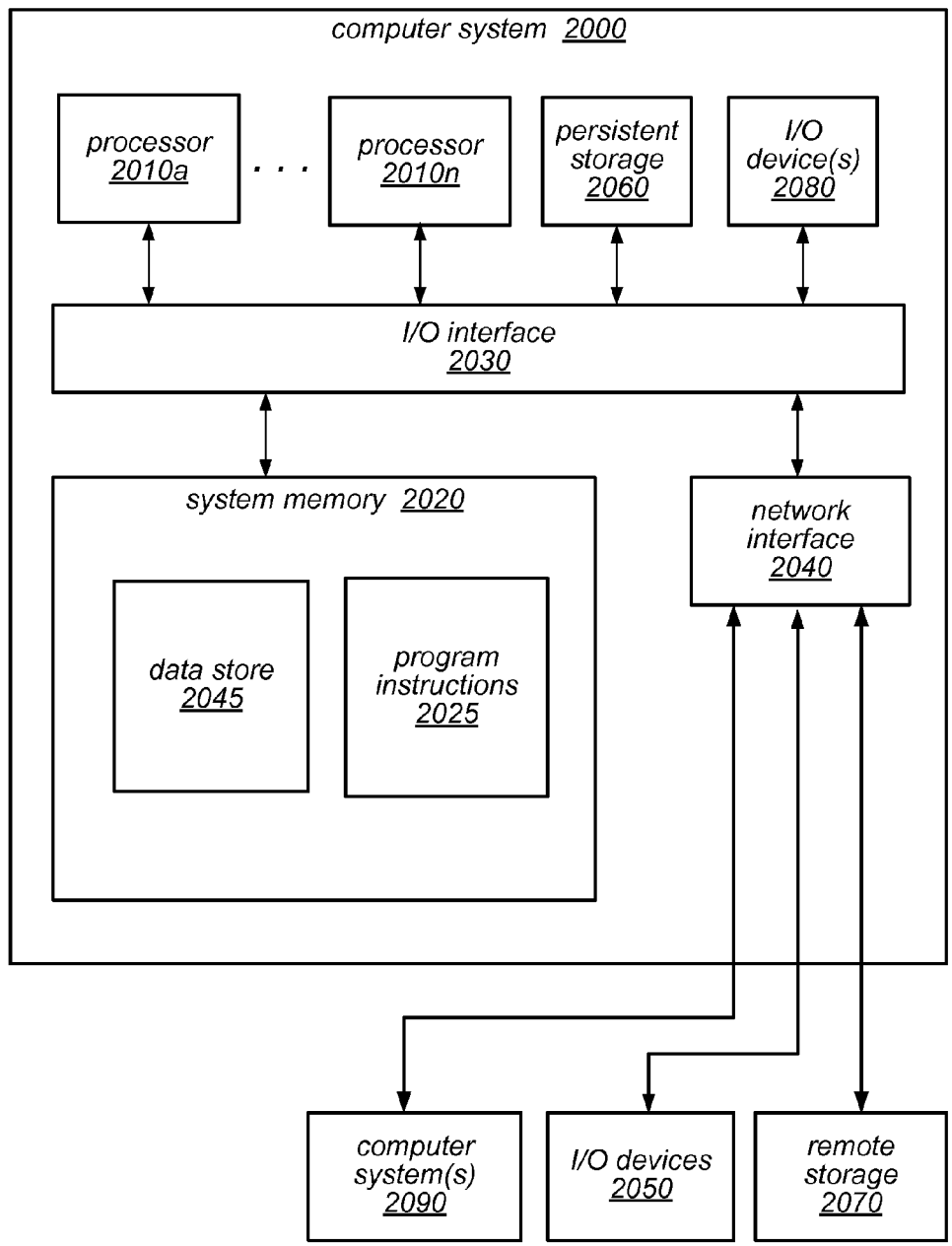
FIG. 13 illustrates an example computing system, according to some embodiments.

FIG. 13 is a block diagram illustrating a computer system configured to implement at least a portion of the storage or other database systems described herein, according to various embodiments. For example, computer system 2000 may be configured to implement a database engine head node of a database tier, or one of a plurality of storage nodes of a separate distributed storage system that stores databases and associated metadata on behalf of clients of the database tier, in different embodiments. Computer system 2000 may also be configured to implement a database system that includes both the database tier and the storage tier. Computer system 2000 may be any of various types of devices, including, but not limited to, a personal computer system, desktop computer, laptop or notebook computer, mainframe computer system, handheld computer, workstation, network computer, a consumer device, application server, storage device, telephone, mobile telephone, or in general any type of computing device.

Computer system 2000 includes one or more processors 2010 (any of which may include multiple cores, which may be single or multi-threaded) coupled to a system memory 2020 via an input/output (I/O) interface 2030. Computer system 2000 further includes a network interface 2040 coupled to I/O interface 2030. In various embodiments, computer system 2000 may be a uniprocessor system including one processor 2010, or a multiprocessor system including several processors 2010 (e.g., two, four, eight, or another suitable number). Processors 2010 may be any suitable processors capable of executing instructions. For example, in various embodiments, processors 2010 may be general-purpose or embedded processors implementing any of a variety of instruction set architectures (ISAs), such as the x86, PowerPC, SPARC, or MIPS ISAs, or any other suitable ISA. In multiprocessor systems, each of processors 2010 may commonly, but not necessarily, implement the same ISA. The computer system 2000 also includes one or more network communication devices (e.g., network interface 2040) for communicating with other systems and/or components over a communications network (e.g. Internet, LAN, etc.). For example, a client application executing on system 2000 may use network interface 2040 to communicate with a server application executing on a single server or on a cluster of servers that implement one or more of the components of the database systems described herein. In another example, an instance of a server application executing on computer system 2000 may use network interface 2040 to communicate with other instances of the server application (or another server application) that may be implemented on other computer systems (e.g., computer systems 2090).

In the illustrated embodiment, computer system 2000 also includes one or more persistent storage devices 2060 and/or one or more I/O devices 2080. In various embodiments, persistent storage devices 2060 may correspond to disk drives, tape drives, solid state memory, other mass storage devices, or any other persistent storage device. Computer system 2000 (or a distributed application or operating system operating thereon) may store instructions and/or data in persistent storage devices 2060, as desired, and may retrieve the stored instruction and/or data as needed. For example, in some embodiments, computer system 2000 may host a storage system server node, and persistent storage 2060 may include the SSDs attached to that server node.

Computer system 2000 includes one or more system memories 2020 that are configured to store instructions and data accessible by processor(s) 2010. In various embodiments, system memories 2020 may be implemented using any suitable memory technology, (e.g., one or more of cache, static random access memory (SRAM), DRAM, RDRAM, EDO RAM, DDR 10 RAM, synchronous dynamic RAM (SDRAM), Rambus RAM, EEPROM, non-volatile/Flash-type memory, or any other type of memory). System memory 2020 may contain program instructions 2025 that are executable by processor(s) 2010 to implement the methods and techniques described herein. In various embodiments, program instructions 2025 may be encoded in platform native binary, any interpreted language such as Java™ byte-code, or in any other language such as C/C++, Java™, etc., or in any combination thereof. For example, in the illustrated embodiment, program instructions 2025 include program instructions executable to implement the functionality of a database engine head node of a database tier, or one of a plurality of storage nodes of a separate distributed storage system that stores databases and associated metadata on behalf of clients of the database tier, in different embodiments. In some embodiments, program instructions 2025 may implement multiple separate clients, server nodes, and/or other components.

In some embodiments, program instructions 2025 may include instructions executable to implement an operating system (not shown), which may be any of various operating systems, such as UNIX, LINUX, Solaris™, MacOS™, Windows™, etc. Any or all of program instructions 2025 may be provided as a computer program product, or software, that may include a non-transitory computer-readable storage medium having stored thereon instructions, which may be used to program a computer system (or other electronic devices) to perform a process according to various embodiments. A non-transitory computer-readable storage medium may include any mechanism for storing information in a form (e.g., software, processing application) readable by a machine (e.g., a computer). Generally speaking, a non-transitory computer-accessible medium may include computer-readable storage media or memory media such as magnetic or optical media, e.g., disk or DVD/CD-ROM coupled to computer system 2000 via I/O interface 2030. A non-transitory computer-readable storage medium may also include any volatile or non-volatile media such as RAM (e.g. SDRAM, DDR SDRAM, RDRAM, SRAM, etc.), ROM, etc., that may be included in some embodiments of computer system 2000 as system memory 2020 or another type of memory. In other embodiments, program instructions may be communicated using optical, acoustical or other form of propagated signal (e.g., carrier waves, infrared signals, digital signals, etc.) conveyed via a communication medium such as a network and/or a wireless link, such as may be implemented via network interface 2040.

In some embodiments, system memory 2020 may include data store 2045, which may be configured as described herein. For example, the information described herein as being stored by the database tier (e.g., on a database engine head node), such as a transaction log, an undo log, cached page data, or other information used in performing the functions of the database tiers described herein may be stored in data store 2045 or in another portion of system memory 2020 on one or more nodes, in persistent storage 2060, and/or on one or more remote storage devices 2070, at different times and in various embodiments. Similarly, the information described herein as being stored by the storage tier (e.g., redo log records, coalesced data pages, and/or other information used in performing the functions of the distributed storage systems described herein) may be stored in data store 2045 or in another portion of system memory 2020 on one or more nodes, in persistent storage 2060, and/or on one or more remote storage devices 2070, at different times and in various embodiments. In general, system memory 2020 (e.g., data store 2045 within system memory 2020), persistent storage 2060, and/or remote storage 2070 may store data blocks, replicas of data blocks, metadata associated with data blocks and/or their state, database configuration information, and/or any other information usable in implementing the methods and techniques described herein.

In one embodiment, I/O interface 2030 may be configured to coordinate I/O traffic between processor 2010, system memory 2020 and any peripheral devices in the system, including through network interface 2040 or other peripheral interfaces. In some embodiments, I/O interface 2030 may perform any necessary protocol, timing or other data transformations to convert data signals from one component (e.g., system memory 2020) into a format suitable for use by another component (e.g., processor 2010). In some embodiments, I/O interface 2030 may include support for devices attached through various types of peripheral buses, such as a variant of the Peripheral Component Interconnect (PCI) bus standard or the Universal Serial Bus (USB) standard, for example. In some embodiments, the function of I/O interface 2030 may be split into two or more separate components, such as a north bridge and a south bridge, for example. Also, in some embodiments, some or all of the functionality of I/O interface 2030, such as an interface to system memory 2020, may be incorporated directly into processor 2010.

Network interface 2040 may be configured to allow data to be exchanged between computer system 2000 and other devices attached to a network, such as other computer systems 2090 (which may implement one or more storage system server nodes, database engine head nodes, and/or clients of the database systems described herein), for example. In addition, network interface 2040 may be configured to allow communication between computer system 2000 and various I/O devices 2050 and/or remote storage 2070. Input/output devices 2050 may, in some embodiments, include one or more display terminals, keyboards, keypads, touchpads, scanning devices, voice or optical recognition devices, or any other devices suitable for entering or retrieving data by one or more computer systems 2000. Multiple input/output devices 2050 may be present in computer system 2000 or may be distributed on various nodes of a distributed system that includes computer system 2000. In some embodiments, similar input/output devices may be separate from computer system 2000 and may interact with one or more nodes of a distributed system that includes computer system 2000 through a wired or wireless connection, such as over network interface 2040. Network interface 2040 may commonly support one or more wireless networking protocols (e.g., Wi-Fi/IEEE 802.11, or another wireless networking standard). However, in various embodiments, network interface 2040 may support communication via any suitable wired or wireless general data networks, such as other types of Ethernet networks, for example. Additionally, network interface 2040 may support communication via telecommunications/telephony networks such as analog voice networks or digital fiber communications networks, via storage area networks such as Fibre Channel SANs, or via any other suitable type of network and/or protocol. In various embodiments, computer system 2000 may include more, fewer, or different components than those illustrated in FIG. 13 (e.g., displays, video cards, audio cards, peripheral devices, other network interfaces such as an ATM interface, an Ethernet interface, a Frame Relay interface, etc.)

It is noted that any of the distributed system embodiments described herein, or any of their components, may be implemented as one or more web services. For example, a database engine head node within the database tier of a database system may present database services and/or other types of data storage services that employ the distributed storage systems described herein to clients as web services. In some embodiments, a web service may be implemented by a software and/or hardware system designed to support interoperable machine-to-machine interaction over a network. A web service may have an interface described in a machine-processable format, such as the Web Services Description Language (WSDL). Other systems may interact with the web service in a manner prescribed by the description of the web service's interface. For example, the web service may define various operations that other systems may invoke, and may define a particular application programming interface (API) to which other systems may be expected to conform when requesting the various operations.

In various embodiments, a web service may be requested or invoked through the use of a message that includes parameters and/or data associated with the web services request. Such a message may be formatted according to a particular markup language such as Extensible Markup Language (XML), and/or may be encapsulated using a protocol such as Simple Object Access Protocol (SOAP). To perform a web services request, a web services client may assemble a message including the request and convey the message to an addressable endpoint (e.g., a Uniform Resource Locator (URL)) corresponding to the web service, using an Internet-based application layer transfer protocol such as Hypertext Transfer Protocol (HTTP).

In some embodiments, web services may be implemented using Representational State Transfer ("RESTful") techniques rather than message-based techniques. For example, a web service implemented according to a RESTful technique may be invoked through parameters included within an HTTP method such as PUT, GET, or DELETE, rather than encapsulated within a SOAP message.

The various methods as illustrated in the figures and described herein represent example embodiments of methods. The methods may be implemented manually, in software, in hardware, or in a combination thereof. The order of any method may be changed, and various elements may be added, reordered, combined, omitted, modified, etc.

Although the embodiments above have been described in considerable detail, numerous variations and modifications may be made as would become apparent to those skilled in the art once the above disclosure is fully appreciated. It is intended that the following claims be interpreted to embrace all such modifications and changes and, accordingly, the above description to be regarded in an illustrative rather than a restrictive sense.

What is claimed is:

1. A system, comprising:
   at least one processor;
   a system memory, comprising program instructions that when executed by the at least one processor cause the at least one processor to implement a storage engine;
   one or more block-based persistent storage devices configured to store a plurality of data pages as part of a data store;
   the storage engine configured to:
      write to the system memory a plurality of log records indicating changes to at least one of the plurality of data pages, wherein the plurality of log records are maintained according to a version threshold for the plurality of data pages;
      receive a request for a version of a particular data page of the plurality of data pages, wherein the requested version of the particular data page is within the version threshold for the plurality of data pages;
      in response to receipt of the request:
         access the one or more block-based persistent storage devices to obtain the particular data page;
         generate the requested version of the particular data page from one or more of the plurality of log records from the system memory that are associated with the particular data page and applied to the particular data page; and provide the generated version of the particular data page.

2. The system of claim 1, wherein the storage engine is further configured to:
   detect a new version threshold for the plurality of data pages; and
   identify one or more log records of the plurality of log records to be scheduled for one or more coalesce operations to update those respective data pages of the plurality of data pages in the persistent storage associated with the identified one or more log records according to the new version threshold for the plurality of data pages.

3. The system of claim 2, wherein the storage engine is further configured to:
   perform the one or more coalesce operations to update the respective data pages of the plurality of data pages in the one or more block-based persistent storage devices that are associated with the identified one or more log records; and
   reclaim space in the system memory for maintaining new data.

4. The system of claim 1, wherein the data store is a distributed data store that maintains the plurality of data pages for a database, wherein the storage engine is implemented at a storage node of the distributed data store, wherein the database and the distributed data store are respective network-based services implemented as part of a network-based service platform, and wherein the plurality of data pages are maintained for a particular client of a plurality of clients of the network-based service platform.

5. A method, comprising:
   performing, by one or more computing devices:
      maintaining, in system memory, a plurality of log records indicating changes to data pages maintained in persistent storage as part of a data store, wherein the plurality of log records are maintained according to a version threshold;
      receiving a request for a version of a particular data page, wherein the requested version of the particular data page is within the version threshold;
      in response to receiving the request:
         accessing the persistent storage to obtain the particular data page;
         applying one or more of the plurality of log records from the system memory that are associated with the particular data page to generate the requested version of the particular data page; and
         providing the generated version of the particular data page.

6. The method of claim 5, further comprising:
   determining a new version threshold; and
   identifying one or more log records of the plurality of log records to be scheduled for one or more coalesce operations to update the data pages associated with the identified one or more log records according to the new version threshold.

7. The method of claim 6, wherein determining the new version threshold comprises identifying a requested page version for one or more in-flight read requests to the data store, wherein the new version threshold does not exclude the requested page version for the one or more in-flight read requests.

8. The method of claim 6, further comprising:
   performing the one or more coalesce operations to update the data pages in the persistent storage associated with the identified one or more log records; and
   reclaiming space in the system memory for maintaining new data.

9. The method of claim 5, further comprising:
   receiving one or more additional log records indicating changes to at least one of the data pages maintained in the persistent storage;
   in response to receiving the one or more additional log records:
      writing the additional one or more log records to the system memory to be maintained along with the plurality of log records;
      storing the additional one or more log records in the persistent storage as part of a log for the data store, wherein the plurality of log records are previously stored as part of the log; and
      acknowledging the additional one or more log records as durably stored.

10. The method of claim 5, further comprising:
    receiving a request for information based, at least in part, on one or more of the plurality of log records maintained in the system memory; and
    reading the one or more log records from the system memory to provide the requested information.

11. The method of claim 5, further comprising:
    receiving another request for a version of another data page of the data pages;
    performing the accessing, the applying, and the providing for the other request for the version of the other data page;
    wherein a number of the plurality of log records associated with the particular data page is than a number of log records associated with the other data page, and wherein a number of accesses to the persistent storage to generate the version of the particular data page and to generate the version of the other data page is the same.

12. The method of claim 5, wherein the data store is a log-structured data store, and wherein the maintaining, the receiving, the accessing, the applying, and the providing are performed by the log-structured data store maintaining the plurality of data pages for a file system.

13. A non-transitory, computer-readable storage medium, storing program instructions that when executed by one or more computing devices cause the one or more computing devices to implement:
    maintaining, in system memory, a plurality of log records indicating changes to data pages maintained in persistent storage as part of a data store, wherein the plurality of log records are maintained according to a version threshold;
    receiving a request for a version of a particular data page, wherein the requested version of the particular data page is within the version threshold;
    in response to receiving the request:
       accessing the persistent storage to obtain the particular data page;
       applying one or more of the plurality of log records from the system memory that are associated with the particular data page to generate the requested version of the particular data page; and
       providing the generated version of the particular data page.

14. The non-transitory, computer-readable storage medium of claim 13, wherein the program instructions cause the one or more computing devices to further implement:
    determining a new version threshold; and identifying one or more log records of the plurality of log records to be scheduled for one or more coalesce operations to update the data pages in the persistent storage associated with the identified one or more log records according to the new version threshold.

15. The non-transitory, computer-readable storage medium of claim 13, wherein accessing the persistent storage to obtain the particular data page, the program instructions cause the one or more computing devices to implement:
    identifying a storage location in the persistent storage for the particular data page according to an index maintained in the system memory.

16. The non-transitory, computer-readable storage medium of claim 13, wherein the program instructions cause the one or more computing devices to further implement:
    receiving a request for a version of another data page of the data pages, wherein the requested version of the other data page is corresponds to a snapshot of data pages that is stored in the persistent storage;
    in response to receiving the request for the version of the other data page:
        identifying a storage location in the persistent storage for the other data page according to an index maintained in the system memory for the snapshot of the pages; and
        providing the version of the other data page corresponding to the snapshot obtained from the identified storage location in the persistent storage.

17. The non-transitory, computer-readable storage medium of claim 13, wherein the program instructions cause the one or more computing devices to implement:
    receiving one or more additional log records indicating changes to at least one of the data pages maintained in the persistent storage;
    in response to receiving the one or more additional log records:
        writing the additional one or more log records to the system memory to be maintained along with the plurality of log records;
        storing the additional one or more log records in the persistent storage as part of a log for the data store, wherein the plurality of log records are previously stored as part of the log; and
        acknowledging the additional one or more log records as durably stored.

18. The non-transitory, computer-readable storage medium of claim 17, wherein the program instructions cause the one or more computing devices to further implement:
    upon recovery from a data loss in the system memory:
        obtaining the plurality of log records and the additional one or more log records from the persistent storage; and
        writing the plurality of log records and the additional one or more log records from the persistent storage to the system memory for servicing subsequent requests for data pages.

19. The non-transitory, computer-readable storage medium of claim 13, wherein the data store is a distributed data store maintaining the data pages for a database, wherein the maintaining, the receiving, the accessing, the applying, and the providing are performed by a storage node of the distributed data store.

20. The non-transitory, computer-readable storage medium of claim 19, wherein the storage node is one of a plurality of storage nodes maintaining the data pages as part of the distributed data store, and wherein the program instructions cause the one or more computing devices to further implement:
    sending one or more of the plurality of log records from the system memory to another one of the plurality of storage nodes.

* * * * *